(12) United States Patent
Ray et al.

(10) Patent No.: US 10,302,396 B1
(45) Date of Patent: May 28, 2019

(54) METHOD OF AND DEVICE FOR IMPROVING MARKSMANSHIP SKILL

(71) Applicants: Kevin B. Ray, Oakland, CA (US); Steven Weinstein, Palo Alto, CA (US)

(72) Inventors: Kevin B. Ray, Oakland, CA (US); Steven Weinstein, Palo Alto, CA (US)

(73) Assignee: Kinetrope LLC., Palo Alto, CA (US)

( * ) Notice: Subject to any disclaimer, the term of this patent is extended or adjusted under 35 U.S.C. 154(b) by 175 days.

(21) Appl. No.: 15/390,718

(22) Filed: Dec. 27, 2016

Related U.S. Application Data

(60) Provisional application No. 62/274,370, filed on Jan. 3, 2016.

(51) Int. Cl.
| | |
|---|---|
| *F41G 3/26* | (2006.01) |
| *G09B 5/06* | (2006.01) |
| *F41G 11/00* | (2006.01) |
| *F41G 1/473* | (2006.01) |
| *F41G 3/06* | (2006.01) |
| *F41G 1/38* | (2006.01) |

(Continued)

(52) U.S. Cl.
CPC ............... *F41G 3/26* (2013.01); *F41A 33/00* (2013.01); *F41A 33/02* (2013.01); *F41G 1/38* (2013.01); *F41G 1/473* (2013.01); *F41G 3/06* (2013.01); *F41G 3/2655* (2013.01); *F41G 11/00* (2013.01); *G09B 5/06* (2013.01)

(58) Field of Classification Search
None
See application file for complete search history.

(56) References Cited

U.S. PATENT DOCUMENTS

| | | |
|---|---|---|
| 4,653,760 A | 3/1987 | Dyer et al. |
| 5,281,142 A | 1/1994 | Zaeglein |
| H1891 H | 10/2000 | McClenahan et al. |

(Continued)

FOREIGN PATENT DOCUMENTS

WO WO2015142940 9/2015

OTHER PUBLICATIONS

Sebastian O.H. Madgwick, "An efficient orientation filter for inertial and inertial/magnetic sensor arrays," published Apr. 30, 2010, Report x-io and University of Bristol (UK) (2010), retrieved Dec. 31, 2015 at www.x-io.co.uk/res/doc/madgwick_internal_report.pdf.

(Continued)

*Primary Examiner* — Jason T Yen
(74) *Attorney, Agent, or Firm* — Dov Rosenfeld; Inventek

(57) ABSTRACT

A method of training a human for a marksmanship task using a training apparatus, and the apparatus therefor. The apparatus senses and records motions within a time window. The method includes sensing and recording motions sensed by the one or more sensors, detecting a synchronization event, analyzing the sensed and recorded motions that were sensed in the time window, comparing the analyzed sensed and recorded motions with a set of desired analyzed motions to generate difference data; and, responsive to the comparing, presenting to the user in the user's field of perception visual feedback indicating one or both the direction and magnitude of deviation from the set of desired analyzed motions. The presenting the visual feedback to the user is essentially instantaneous, e.g., commencing no later than 10 ms (at most 100 ms) after the synchronization event.

54 Claims, 14 Drawing Sheets

(51) Int. Cl.
*F41A 33/02* (2006.01)
*F41A 33/00* (2006.01)

(56) References Cited

U.S. PATENT DOCUMENTS

| | | | |
|---|---|---|---|
| 6,981,876 | B2 | 1/2006 | Bleckley et al. |
| 8,908,045 | B2 | 12/2014 | Stewart |
| 2004/0137411 | A1 | 7/2004 | Kemp et al. |
| 2006/0201047 | A1 | 9/2006 | Lowrey |
| 2008/0039962 | A1 | 2/2008 | McRae |
| 2009/0111073 | A1 | 4/2009 | Stanley |
| 2011/0053120 | A1 | 3/2011 | Galanis et al. |
| 2011/0217678 | A1 | 9/2011 | Shin |
| 2012/0015332 | A1 | 1/2012 | Stutz |
| 2012/0132709 | A1* | 5/2012 | Lowrey, III ............ F41C 27/22 235/407 |
| 2012/0182417 | A1* | 7/2012 | Everett .................... F41G 1/30 348/135 |
| 2012/0270186 | A1 | 10/2012 | Singh |
| 2013/0203019 | A1 | 8/2013 | Windham |
| 2013/0260342 | A1 | 10/2013 | Stanley |
| 2014/0007484 | A1 | 1/2014 | Erdoss et al. |
| 2014/0038136 | A1 | 2/2014 | Hamilton et al. |
| 2014/0154647 | A1 | 6/2014 | Nolen |
| 2015/0247702 | A1* | 9/2015 | Davidson ................. F41G 1/38 42/122 |

OTHER PUBLICATIONS

R. Mahony, T. Hamel, and J.-M. Pflimlin: "Nonlinear complementary filters on the special orthogonal group. Automatic Control," IEEE Transactions on Automatic Control, vol. 53, No. 5, pp. 1203-1218, Jun. 2008.

"Open source IMU and AHRS algorithms," posted Jul. 31, 2012, and written by x-io Technologies, available Nov. 24, 2016 at x-io.co.uk/open-source-imu-and-ahrs-algorithms/.

Sebastian O.H. Madgwick AHRS algorithms and Sebastian O.H. Madgwick implementation of Mayhony et al AHRS algorithm, See "Package 'RAHRS'" dated Jul. 18, 2015, retrieved Dec. 24, 2016 at cran.r-project.org/web/packages/RAHRS/RAHRS.pdf.

Jose Gama, Sebastian O.H. Madgwick, Alain Barraud, "RAHRS: Data Fusion Filters for Attitude Heading Reference System (AHRS) with Several Variants of the Kalman Filter and the Mahoney and Madgwick Filters" published online on Jul. 18, 2015, retrieved Nov. 24, 2016 at rdrr.io/cran/RAHRS/.

Kris Winer, "Hardware Sensor Fusion Solutions," by last edited on Jul. 28, 2015, available Nov. 22, 2016 at github.com/kriswiner/MPU-6050/wiki/Hardware-Sensor-Fusion-Solutions.

EM7180SPF Ultra Low Power Sensor Fusion Platform made by EM Microelectronic, SA of Marin, Switzerland. A data sheet is available (Nov. 28, 2016) at www.emmicroelectronic.com/sites/default/files/public/products/datasheets/7180sfp-ds.pdf.

H3LIS331DL high-G MEMS accelerometer made by ST Microelectronics. See www.st.com/web/en/resource/technical/document/datasheet/DM00053090.pdf, retrieved Dec. 31, 2015.

Bosch BMP180 barometric pressure and temperature sensor. For more information, see ae-bst.resource.bosch.com/media/products/dokumente/bmp180/BST-BMP180-DS000-12~1.pdf, retrieved Dec. 31, 2015.

"Electrodermal Activity," in en.wikipedia.org/wiki/Electrodermal_activity, retrieved Dec. 10, 2016.

Hirose model ZX62-B-SPA MicroUSB connector. "ed_ZX_20140804.pdf" retrieved Dec. 31, 2015 at https://www.hirose.co.jp/cataloge_hp/ed_ZX_20140804.pdf.

Nordic Semiconductors nRF51822/ See www.nordicsemi.com/eng/Products/Bluetooth-Smart-Bluetooth-low-energy/nRF51822, retrieved Dec. 31, 2015.

Texas Instruments LP55231 LED driver, whose specification may be retrieved (Dec. 31, 2015) at www.ti.com/lit/ds/symlink/lp55231.pdf.

Abracon model ABS05 32.768kHz Crystal, whose specifications are available (Dec. 31, 2015) from www.abracon.com/Resonators/ABS05.pdf.

W3008C ceramic antenna made by Pulse Engineering. See productfinder.pulseeng.com/products/datasheets/W3008_W3008C.pdf, retrieved Dec. 31, 1015.

Maxim Dual-Input Li+ Charger model MAX1555. See datasheets.maximintegrated.com/en/ds/MAX1551-MAX1555.pdf, retrieved Dec. 31, 2015.

Texas Instruments low-drop 200mA 2.8v Regulator power regulator model TLV70728. See www.ti.com/lit/ds/symlink/tlv707.pdf, retrieved Dec. 31, 2015.

Kathleen C. Anderson and Ralph M. Siegel, "Optic Flow Selectivity in the Anterior Superior Temporal Polysensory Area, STPa, of the Behaving Monkey," The Journal of Neuroscience, Apr. 1, 1999, 19(7):2681-2692.

Kaisu Mononen," the Effects of Augmented Feedback on Motor Skill Learning in Shooting," Doctoral Dissertation, Department of Health Sciences, University of Jyväskylä, Finland, 2007.

Seiko Epson FA-20H 16MHz crystal. See www5.epsondevice.com/en/products/mhz_range/fa20h.html, downloadedon Dec. 31, 2015.

Stefan Gezeck,Burkhart Fischer, Jens Timmer, "Saccadic Reaction Times: a Statistical Analysis of Multimodal Distributions," Vision Res., vol. 37, No. 15, pp. 2119-2131, 1997.

Eva V. Monsma Review of Imagery in Sport by Tony Morrir, Michael Spittle, and Anthony Watt, in *The Sport Psychologist*, 2006, 20, 95-97.

Deadeye Marksmanship_Indiegogo, Retrieved Dec. 29, 2015 at https://www.indiegogo.com/projects/deadeye-marksmanship#/.

InvenSense MPU-9250 Product Specification, Rev. 1.0, InvenSense Inc. 1745 Technology Drive, San Jose, CA 95110 U.S.A., Document PS-MPU-9250A-01, Jan. 17, 2014.

U.S. Statutory Invention Registration No. H1,891 to McClenahan et al., published Oct. 3, 2000, filed Feb. 14, 1997.

* cited by examiner

METHOD OF AND DEVICE FOR IMPROVING MARKSMANSHIP SKILL

RELATED APPLICATION

The present invention claims priority of U.S. Provisional Pat. App. No. 62/274,370 filed Jan. 3, 2016 to inventors Ray et al., titled METHOD OF AND DEVICE FOR IMPROVING MARKSMANSHIP SKILL, the contents of which are incorporated herein their entirety.

FIELD OF THE INVENTION

The invention is related to devices for and methods of training humans to develop marksmanship skills such as fine motor skills used in aiming and firing a firearm or other shooting device to hit a target, e.g., without limitation, shooting a gun, shooting a bow archery device, and shooting a billiard cue ball with a billiard cue stick.

BACKGROUND

Learning a precision sport such as firearm marksmanship, archery marksmanship, or billiards marksmanship typically requires many hours—possibly hundreds or even thousands of hours of repetitive practice. Such a lengthy process may be due to the nature of how kinematic actions involved in a marksmanship task are recorded in the human brain. There are theories that muscle movements are first recorded in and/or encoded by the premotor cortex of the brain (an area of the motor cortex lying within the frontal lobe of the brain just anterior to the primary motor cortex), and then consolidated and stored in the brain's primary motor cortex, typically during rest or sleep. Muscle memory training thus may involve continuing evolution of neural processes after stopping practicing a desired precision sport task.

In this description and the claims attached thereto, the terms marksmanship and related terms, such as a marksman being a person skilled in marksmanship, are used herein to denote skills required in any precision sport that requires aiming, firing, and hitting a target in a desired manner, and therefore is not limited to shooting a firearm. The term includes for example firearm marksmanship, archery marksmanship, and billiards marksmanship.

Existing kinematic training devices are known that focus on gross motor development—long kinematic sequences that involve multiple muscle groups and joint rotations lasting even as long as several seconds. Such devices analyze the motions and provided feedback for a complete motion such as a golf swing or baseball pitch. Use of such a training device may require the user to apply cognitive skills to interpret the results and then to use additional cognitive skills to process the movement modifications being coached. This type of explicit learning of the elements of a gross motor skill could tend to break down when the user is under pressure. This type of learning also may even increase the time it takes for a user to learn or improve a skill. The so-called Conscious Processing Hypothesis predicts that users require more neuronal processing to control explicitly-learned movements under pressure and that such pressure takes away available resources for processing task and goal stimuli required for the situation. Additionally, Conscious Processing may cause a delay in learning kinematic sequences. The Conscious Processing Hypothesis is a self-focus theory which suggests that pressure situations may raise anxiety and heighten self-consciousness about performing successfully. This heightened self-consciousness may cause performers to attempt to control previously automated skilled behavior consciously. In doing so, the control may disrupt the fluency associated with expert performance. By 'reinvesting' in the knowledge base that supports performance, the process may cause a breakdown of automated movement units into a more consciously controlled sequence of smaller, separate units. This process may slow performance and may create opportunity for error at each transition between units.

The approaches described in this BACKGROUND section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

For a more complete understanding of the present invention, and for further details and advantages thereof, reference is now made to the following drawings and descriptions thereof.

FIG. 5A shows a simplified plane view image of the LED ring display of FIGS. 4B and 4C, while

FIG. 6A shows another embodiment of a display subassembly that includes a flat panel display such as an OLED display, an LCD display element, or some other substantially planar display, while

Figure 8:
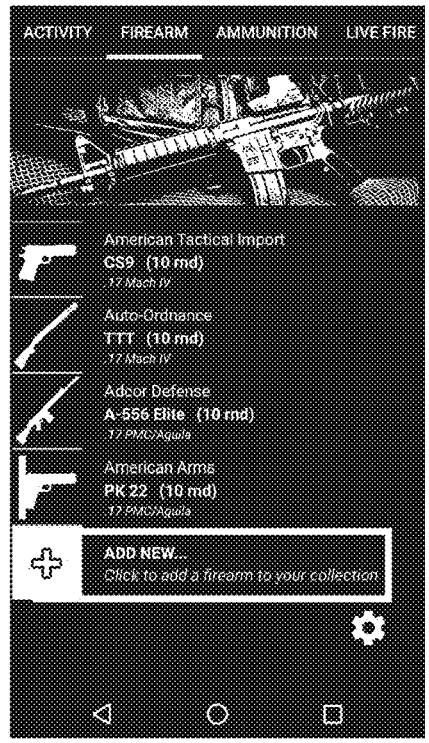
FIGS. 8-14 show screen displays on the secondary device caused by software (an app) operating on the secondary device according to an embodiment of the invention.

In particular:

FIG. 8 shows an example of a display in a fragment we call the FIREARM fragment.

Figure 9:
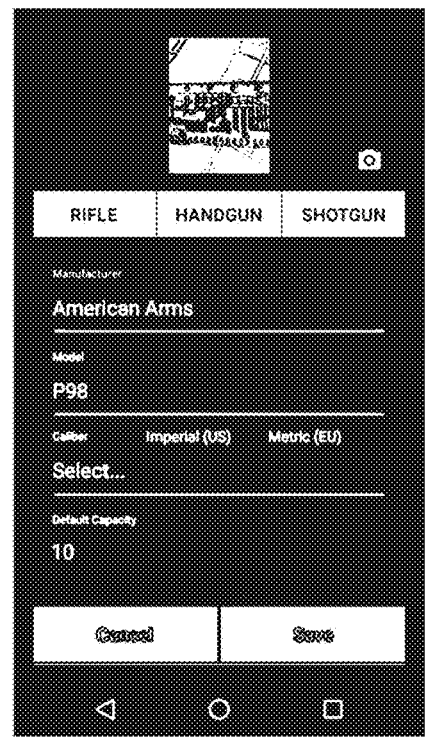
Figure 10:
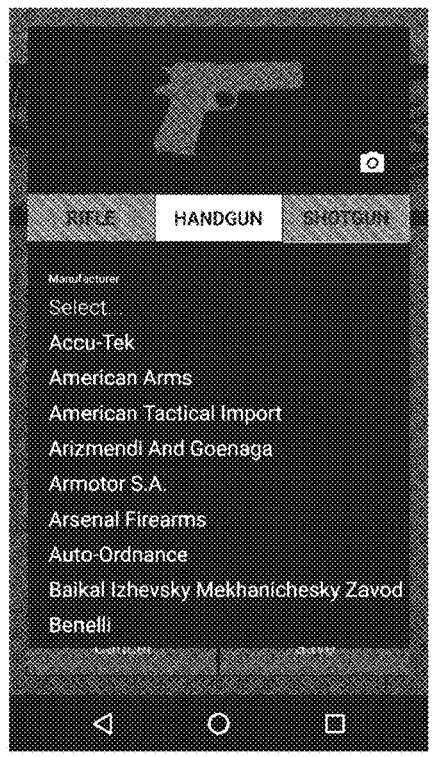

FIG. 9 shows an example display that results when the user selects to add a new firearm in the FIREARM fragment shown in FIG. 10, according to an embodiment of the invention.

FIG. 10 shows a drop-down autocomplete widget for the firearm selected to be added by the user, according to an embodiment of the invention.

Figure 11:

FIG. 11 shows the AMMUNITION fragment, which is the next fragment that is displayed after the firearm is selected, according to an embodiment of the invention.

Figure 12:

FIG. 12 shows the live data of the "LIVE FIRE" fragment that is displayed on the secondary device after ammunition is selected, according to an embodiment of the invention.

Figure 13:
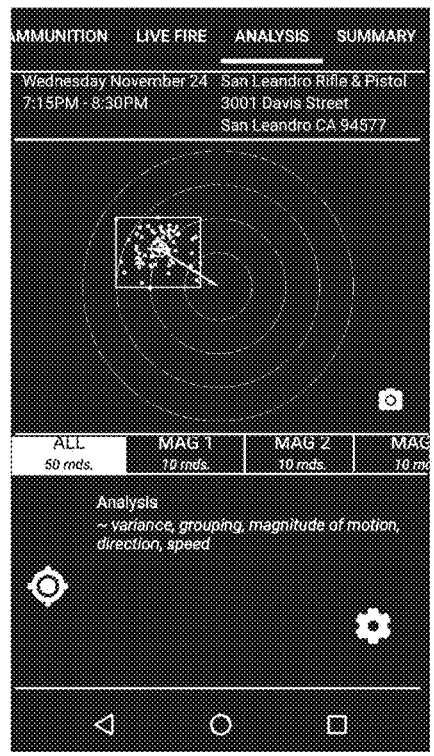

FIG. 13 shows a first analysis display of the ANALYSIS fragment shown of where each shot should have landed based on analysis of the recorded motions, according to an embodiment of the invention.

Figure 14:
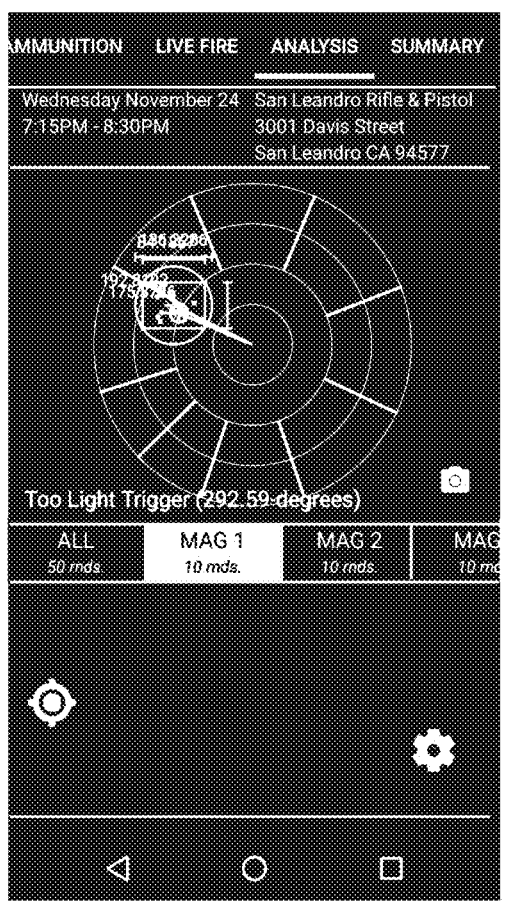

FIG. 14 shows a second analysis display of the ANALYSIS fragment shown of where each shot should have landed based on analysis of the recorded motions, according to an embodiment of the invention.

DETAILED DESCRIPTION

Overview

One embodiment is an apparatus to train a human to improve fine motor skills to improve performance in firearm marksmanship and other aim-based tasks.

The shooting of a firearm is an example of what we call a synchronization event for the case of firearm marksmanship. In the case of cue sports, also known as "billiard sports," which include any of a wide variety of games of skill (e.g., e.g., billiards, pool, pocket billiards, and so forth) generally played with a cue stick which is used to strike a billiard ball (called a cue ball) which in turn may strike another billiard ball or a cushion around a cloth-covered billiards tablebounded by the rubber cushions, possible with other obstacles, the striking of the cue ball is the synchronization event. In archery, the release of a bow string to fire an arrow is the synchronization event.

One embodiment of this invention includes a machine implemented method of training precision fine motor skills. The method comprises the steps of: (a) sensing the kinematics of fine motor skills immediately before and during a target shooting event being practiced for improving marksmanship (such a shooting event is called a synchronization event in the case of shooting at a target); (b) calculating the deviation of the sensed kinematics from ideal kinematics for the fine motor skill; (c) with short latency from the time of carrying out a target shooting event, e.g., in the order of 10-20 ms or even less (in other embodiments, at most 100 ms), providing at least visual feedback, and possibly aural and haptic feedback to the user "almost" immediately, indicating the deviation from the ideal kinematic motion, and (d) in some embodiments, possibly as a user-selected option, recording the information on the same or a separate device for later review and additional feedback. Other systems, methods and devices are disclosed. Embodiments of this invention might be useful for teaching users how to improve in playing a wide variety of sports. Embodiments of the invention might also useful for the rehabilitation (the re-training) of a user to regain a skill level in a specific sport or general action as a result of illness or injury. Embodiments of the invention also might be able to help a person regain a level of marksmanship skill after a hiatus of time from performing the skill.

One apparatus embodiment of the present invention is designed for training fine motor development—small muscle movements with brief kinematic sequences—using implicit rather than explicit learning methods. One apparatus embodiment provides feedback quickly, e.g., in under 100 ms, e.g., within 10 ms of a shooting event (the synchronization event in the example of shooting a firearm), the feedback being on the deviation between the actual motion from the required motion, and further provides the feedback in a manner that does not require much if any conscious effort by the user to perceive the feedback, e.g., by presenting the feedback as a relatively simple image in the user's field of vision, or as a sound (an example of audio feedback), or as a touch sensation (an example of haptic feedback). While the invention and its usefulness in training does not depend on correctness of any theory, it is believed that increasing stimulation of polysensory regions of the brain with readily perceivable feedback on performance accelerates the process of implicit learning of the kinematic sequence involved in a task such as marksmanship.

One embodiment of this invention is a motion tracking apparatus that includes a kinematic analysis subsystem and feedback mechanism to carry out marksmanship training by training what we call 'muscle memory.' The goal is to learn the motion needed for good marksmanship. One embodiment is an apparatus that incorporates a number of motion sensors which may include at least one of the following sensor types: one or more accelerometers, a gyroscope, a magnetometer, one or more electro-dermal activity sensors, and a barometric pressure sensor. These are coupled to a processor subsystem, e.g., to a microcontroller and memory, and to a mechanism to determine a firing event, and to store sensed kinematic and other data, so that a record is kept starting a period of time, e.g., 100 ms-200 ms before a detected firing event. Coupled to the microcontroller are one or more devices that provide at least one of visual feedback, aural feedback, and haptic feedback to a user "almost" immediately, e.g., in the order of 10 ms, and more generally less than 100 ms after a firing event. Such one or more feedback devices that provide at least visual feedback include one or more displays, e.g., one or more multiple-LED indicators and/or an OLED display. One or more feedback devices that provide other feedback to a user may include one or more haptic feedback devices and/or one or more sound producing elements, e.g., one or more speakers.

Some embodiments further include a GPS subsystem to record geographic location.

Embodiments of the motion tracking apparatus are operative to record in sufficiently high-temporal resolution, motion data of the motions occurring during firearm shooting (or billiard or shooting into a data structure, e.g., into a circular buffer of a selected size, and to wait for a synchronization event that indicates that the motion to be learned, e.g., the shooting has just happened. In some versions, software in the microcontroller subsystem, e.g., in included memory, when executed compares the recorded motion data—which in some embodiments is linearized—with a stored pattern of the expected kinematic motion for the to-be-learned motion, and determines an amount of deviation between the recorded motion data and the stored pattern of expected motion. The software in the microcontroller subsystem when executed, in response to the synchronization event (e.g., the shooting event) and the determining of deviation, generates and provides feedback to the user about the recorded motion data, including information showing in visual form the magnitude and direction of the determined deviation. Such feedback provided using one or more of the feedback devices. In some versions, as an option, information is transmitted from the motion tracking apparatus to one or more other systems, e.g., to a secondary apparatus or broadcast to a group of devices. The transmitted/broadcast information may contain the full data capture of motion and other data around the time of the synchronization event for later analysis and recording.

One apparatus embodiment incorporates high-resolution sensors into a small wireless device incorporating a microcontroller, radio modem, memory storage, motion and orientation sensors, and visual, aural and haptic feedback components.

Various sensors which may include multi-axis accelerometer, multi-axis magnetometer, multi-axis gyroscope, barometric pressure sensor, a GPS receiver, or others are connected on a serial data bus such as universal asynchronous receiver/transmitter (UART), Inter-Integrated Circuit (I2C), or Serial Peripheral Interface (SPI) to a microcontroller. The sensors may also have a hardware interrupt connection to the microcontroller.

In some embodiments, a wireless data radio such as Bluetooth Low-Energy (BLE) or Wi-Fi is coupled to the microcontroller along with a standard serial interface such as USB. A battery is connected via a charging controller to the circuit.

In some embodiments, a stream of motion data in the form of quaternion values representing acceleration and orientation is collected from the sensors and fed into the microcontroller. This data is stored in a buffer of a size sufficient for recording the sensed motion and orientation data of the kinematic sequence being learned. In one example embodiment, the buffer is a circular buffer that can store at least 300 ms of data at a sampling rate such that there is data for at least 200 ms before and at least 100 ms after a detected synchronization event. Of course other embodiments may store more or less data. The sampling rate is selected to match the rate possible for the fastest sensor. In one embodiment, the sensor sampling rate is 1 kHz. Of course the invention is not limited to such sampling rate. For sensors that are not as fast as the fastest sensor, data of sample points between those measured is interpolated. For example, if a sensor is only capable of 100 samples per second, the data between each tenth sample at 1 kHz is filled in by interpolation. In one embodiment, simple zero-order interpolation is used, i.e., the data between each 10th sample is filled in with the same value as the most recent sample. In a more sophisticated interpolation, linear predictive interpolation is used, i.e., the data is determined by linearly extrapolating the previous two sample points. Other methods of interpolation are used in alternate embodiments. Note that the term interpolating as used herein to fill in samples includes extrapolating and predicting.

Note that while some embodiments use quaternions values for acceleration and orientation, other values can be used, e.g., Euler angles and accelerations in alternate embodiments.

In some embodiments, the microcontroller runs software which implements a finite state machine (FSM). The recorded data is continually processed by the FSM to enable the detection of a specific sequence of movements. When the detected sequence of movements matches a stored set of movements representing a synchronization event, the circular buffer is linearized. This may be a sequence of matched states of the FSM or of a single matched FSM state such as the generation of a hardware interrupt, expiration of a timer, or closing of a circuit from the pushing of a button.

Some embodiments include linearization of the circular buffer. The linearization may be carried out by copying memory from the circular buffer into a destination buffer that is at least the same size. The quaternion values stored in the circular buffer are copied starting from the location marked by a Current Read Index to the destination buffer starting at a Base Address (e.g., an address designated as 00) and written such that the oldest recorded quaternions are written first and all the values are written in a sorted fashion from oldest to newest.

In some embodiments, the contents of the destination buffer are compared to contents of a memory buffer stored in RAM and the deviation is determined by summing the resultant of the comparison (the vector difference) of each element. This process yields a vector containing both a direction and magnitude. The direction is indicative of the direction of error from the desired target. The magnitude is indicative of the magnitude of the error. The resultant magnitude is compared to a table that determines the specific mechanism for feedback to the user. For sufficiently small magnitudes, no feedback may be given. For larger magnitudes, varying degrees of visual, aural and haptic feedback may be given.

Of course other measures of deviation may be used in alternate embodiments, e.g., sum of square differences and angular direction of deviation, etc.

One embodiment of the feedback to the user is a display shaped as a circular ring of light-emitting diodes. The resultant magnitude and direction of motion is indicated on the display by illuminating a sequence of LEDs forming an arc. A visualization of this example of feedback display is analogous to a digital bubble level. A direction from the center of the circle and the midpoint of the arc is indicative of the direction of motion. The arc-length is indicative of, and determined by the magnitude of the motion.

Another set of embodiments uses a flat panel raster or dot matrix display implemented as either an LCD or OLED. With such embodiments, in some versions, a vector (e.g., a straight line) is displayed in the direction indicating the motion and with a length determined by the magnitude of the motion. In some versions, a second method of display can be a real-time display of this motion. The animated line moves in immediate feedback with the sensed motion. This visualization allows the user to quiet their motions with "instant" real time feedback of what is happening.

Some embodiments of the device may include additionally or as an alternative one or more other forms of feedback. One such feedback is audible feedback. Another is haptic feedback. The audible may typically be the sound of the firearm firing, and this is combined with the essentially immediate visual information presented to the user. In some version, additional audible feedback may be presented via one or more speakers, e.g., in speakers included in ear-protecting earmuffs or other ear-protective devices meant to reduce firearm noise. Such additional audible feedback may be in the form of tones that denote the type of error and the magnitude of the error by altering pitch, volume, and duration. One version of audible feedback in which speakers are located in each ear's protective covering, binaural processing is used to indicate the direction of the error.

Haptic feedback may be directly incorporated into the device or provided remotely via a wireless or wired connection to provide feedback via pulses, amplitude of the haptic feedback, frequency of feedback and/or duration of the haptic feedback, Additionally, in accordance with some embodiments, the device may transmit the data to a secondary device like a smart phone, tablet, or centralized repository for later analysis, later display of historical data. This may include capturing improvements of over time, hinting of ways to use the device and additional input settings for the device if the device is not a standalone device with input and more sophisticated display technology.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

DETAILED DESCRIPTION OF EXAMPLE EMBODIMENTS

The technical subject matter addressed by embodiments of the invention may promote automated, what we call implicit learning of the skills needed for improve marksmanship. It is believed by some, and some studies have confirmed the belief that kinematic sequences which have been learned through such implicit learning techniques may require less neuronal resources and are repeated by users under pressure more rapidly and with less error. It is also believed by some that such techniques decrease the time it takes to learn the sequences.

By analyzing the kinematics of someone playing video games, it appeared to us, the inventors, that precise, time-synchronized, fine motor skills are learned by users playing video games much faster than by users practicing such skills in real-world situations such as shooting firearm marksmanship. One reason for this might be that the essentially immediate visual, aural and haptic feedback provided to the video game player cause a polysensory region of the brain to become stimulated and accelerate the flow of data from the premotor cortex into the primary motor cortex of the brain. Another reason may be that by giving immediate feedback, e.g., in a few ms or a few tens of ms, the video game player is able to correct errant muscle movements and have a higher rate of accurate muscle movements.

Embodiments of this invention may accelerate marksmanship training, such training requiring, e.g., muscle memory training. Such embodiments may do so by stimulating the polysensory region of the brain during the practice of fine motor skills and by giving essentially immediate (in the order of 10 ms or so from the firing of a firearm) feedback to a user of how accurately the user's recorded movements match a set of expected movements.

Note that any embodiment described herein and each invention described herein does not depend on correctness of any theory, of any assumptions, or of any observations described herein. Any such theories, assumptions, and observations are included herein only to describe possible rationale for why the invention works. The reasoning may very well be incorrect. The embodiments of the inventions however are as described herein and the invention as claimed herein.

Figure 1A:
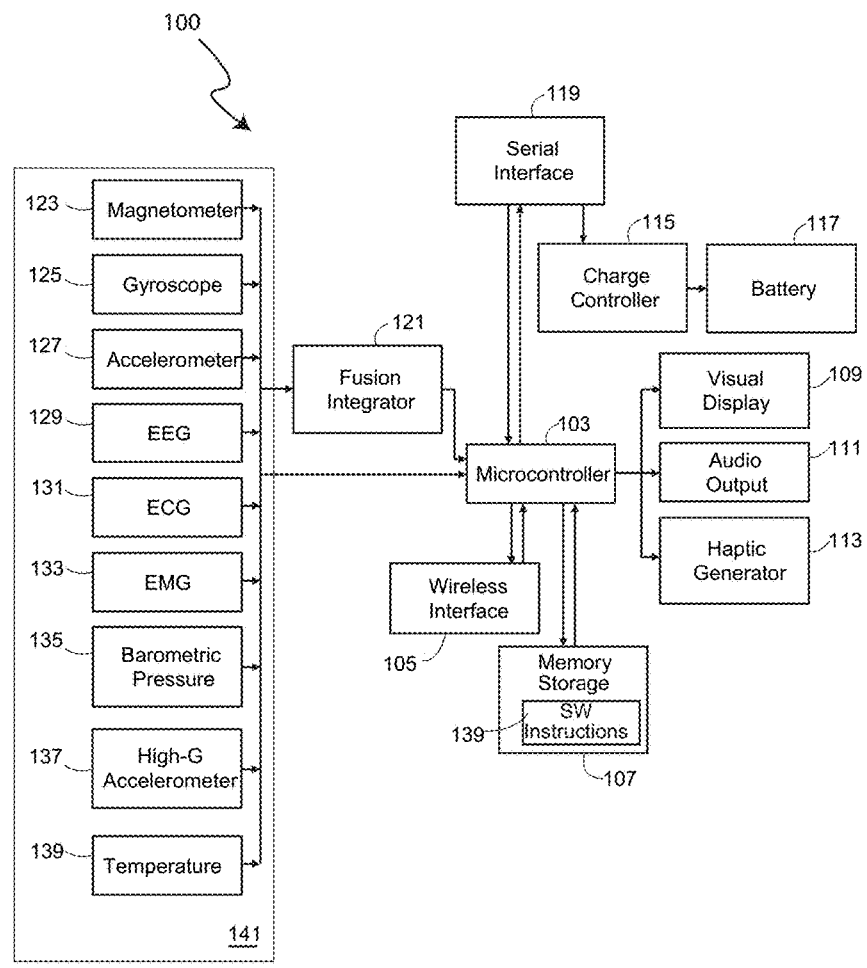
FIG. 1A is a simplified block diagram of an apparatus embodiment of the invention showing elements. Not all embodiments include all shown elements.
Figure 1B:
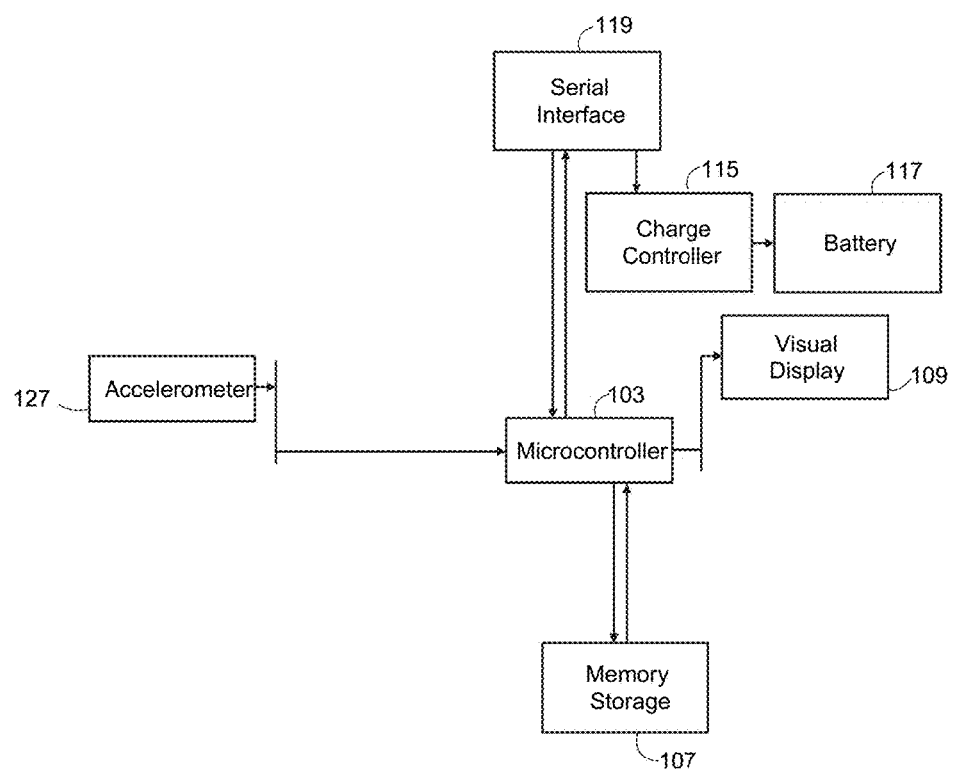
FIG. 1B is a simplified block diagram of an apparatus embodiment that includes only some of the elements shown in FIG. 1A.
Figure 1C:
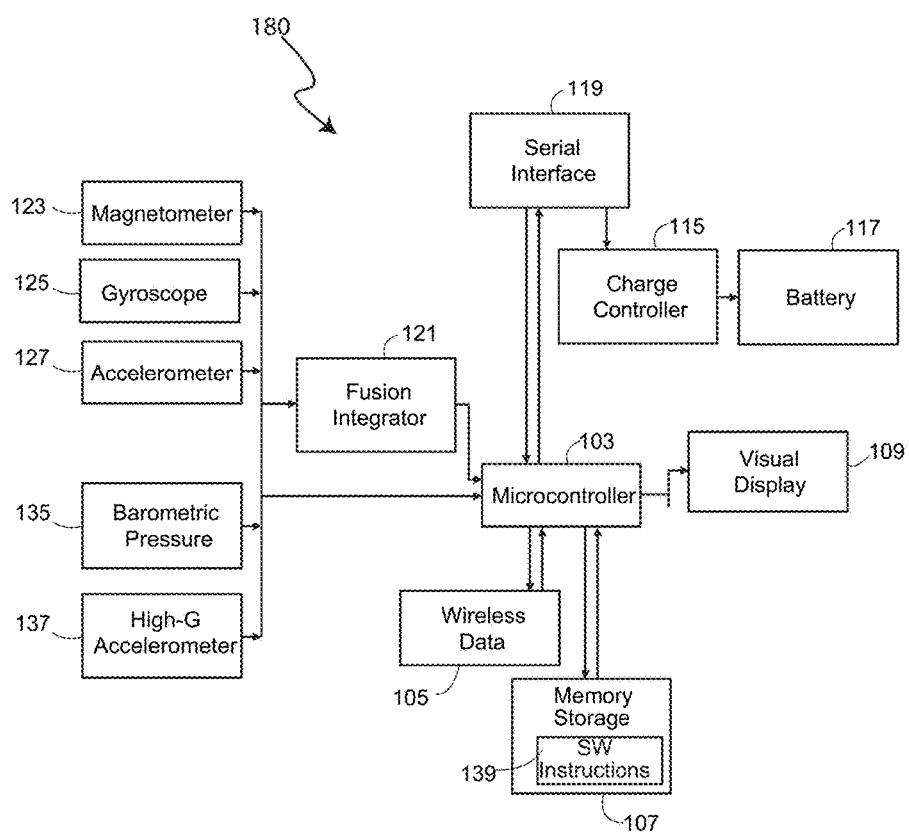
FIG. 1C shows an apparatus embodiment that corresponds to a physical prototype we built.

FIG. 1A is a simplified block diagram of an apparatus embodiment of the invention. Not all embodiments include all the elements shown in FIG. 1A. FIG. 1B for example is a simplified block diagram of another apparatus embodiment that includes only some of the elements shown in FIG. 1A. FIG. 1C shows yet another apparatus embodiment that again includes only some of the elements shown in FIG. 1A, and that corresponds to a physical prototype we built.

All apparatus embodiments include a processing element, shown as microcontroller 103 on which software operates to cause carrying out at least the calculations necessary to determine the feedback to the user. One embodiment includes both static storage memory and dynamic memory (RAM) connected to the microcontroller and shown as storage element 107. The storage element 107 also includes instructions for the microcontroller 103 to operate the device. All software instructions are shown as software instructions element 139. All embodiments further include a device coupled to the microcontroller that provides essentially immediate feedback to the user upon the user's firing, e.g., a firearm on which the device is attached, such user's firing causing a synchronization event to be detected and at least visual feedback to be presented to the user essentially immediately. The device for providing feedback includes one, two, or all of a display element that is in the user's field of view while firing, a device for providing aural feedback, and a device for providing haptic feedback to the user.

In the description herein, for simplicity, it is assumed that the apparatus includes a display element. It would be cleat that alternate embodiments may not include the display element and may include only the device for providing haptic feedback of variable intensity, or only the device for providing aural feedback of variable intensity.

Assuming embodiments with a display element, such embodiments of the apparatus includes a housing that is designed to attach to a firearm in a geometric arrangement such that the display element is visible to the user as the user fires the firearm (in the case of a firearm). The user is thus provided with visual feedback when firing, starting a few ms—no later than 100 ms after the firing event, or better, no more than 100 ms after the firing event, or in other embodiments, even sooner.

The simplified block diagram of FIG. 1A shows a system 100 that includes a set of sensors, including an accelerometer 127, and that further includes a magnetometer 123, at least one gyroscope 125, an electroencephalogram (EEG) detector 129, an electrocardiogram (ECG) measurer 131, an electromyography (EMG) device 133, a barometric pressure measure device 135, and a second, high-G accelerometer 137. A fusion integrator 121 is operative to collect the information obtained the sensors 123, 125, 127, 129, 131, 133, 135, and 137 and to combine these into motion data. The combining is called sensor fusion and is carried out by the element 121 shows as fusion integrator 121.

FIG. 1B shows a simpler apparatus embodiment with only an accelerometer as the sole sensor for dynamics. The function of the fusion integrator 121 is carried out by software operating on the microcontroller 103. FIG. 1C shows using an apparatus embodiment that in addition includes a 3-axis accelerometer, a 3-axes gyroscope, and a magnetometer, with a fusion integrator 121.

In embodiments such as those of FIGS. 1A and 1C, the magnetometer 123 provides an initial compass reading. In one embodiment, magnetometer 123 is a Hall Effect device able to sense terrestrial magnetic force in three axes (denoted x, y, and z). Such embodiments also include a gyroscope 125 and an accelerometer 127 that provide motion data. Data from the sensors 123, 125 and 127 are combined, in one version in an included fusion integrator 121, which in one version is a set of instructions in the memory 107 (forming part of the software instructions 139) that implements a fusion algorithm called a MARG (Magnetic, Angular Rate, Gravity) sensor fusion algorithm. See Sebastian O. H. Madgwick, "An efficient orientation filter for inertial and inertial/magnetic sensor arrays," published Apr. 30, 2010, Report x-io and University of Bristol (UK) (2010), retrieved 2015-Dec.-31 at www<dot>x-io<dot>co<dot>uk/res/doc/madqwick_internal_report<dot>pdf, where "<dot>" represents the period (".") in the actual URL.

One alternate implementation uses a Mahoney filter for the fusion. See R. Mahony, T. Hamel, and J.-M. Pflimlin: "Nonlinear complementary filters on the special orthogonal group. Automatic Control," IEEE Transactions on Automatic Control, vol. 53, No. 5, pp. 1203-1218, June 2008. Another uses a combination of the Mahoney and Madgwick fusion method that uses Madgwick's implementation of Mayhony's 'DCM filter in quaternion form. Open source implementations of these methods are available online on the Web. See, e.g., "Open source IMU and AHRS algorithms," posted Jul. 31, 2012, and written by x-io Technologies, available 2016-Nov.-24 at x-io<dot>co<dot>uk/open-source-imu-and-ahrs-algorithms/, where "<dot>" represents the period (".") in the actual URL.

For a collection of Data fusion filters for Attitude Heading Reference System (AHRS) based on Vlad Maximov's GyroLib AHRS library (quaternion based linearized/extended/unscented Kalman filter, Euler based LKF, gyro-free with vector matching, SVD calibration and EKF calibration), Sebastian O. H. Madgwick AHRS algorithms and Sebastian O. H. Madgwick implementation of Mayhony et al AHRS algorithm, See "Package 'RAHRS'" dated Jul. 18, 2015, retrieved 2016-Dec.-24 at cran<dot>r-project<dot>org/web/packages/RAHRS/RAHRS<dot>pdf, where "<dot>" represents the period (".") in the actual URL. See also Jose Gama, Sebastian O. H. Madgwick, Alain Barraud, "RAHRS: Data Fusion Filters for Attitude Heading Reference System (AHRS) with Several Variants of the Kalman Filter and the Mahoney and Madgwick Filters" published online on 2015-Jul.-18, retrieved 2016-Nov.-24 at rdrr<dot>io/cran/RAHRS/, where "<dot>" represents the period (".") in the actual URL.

It is because the Mahoney and Madgwick methods typically are floating point calculation intensive that some embodiments of the invention use a separate fusion integrator 121 co-processor coupled to the microcontroller 103 for the fusion. Thus, while in one embodiment, the fusion is carried out in software operating on processor 103, e.g., implementing the Madgwick MARG sensor fusion algorithm, in an alternate embodiment, the fusion integrator 121 is implemented by a separate semiconductor element that implements the fusion method. Such an element may be designed as a field-programmable gate array (FPGA) or eventually, as a custom integrated circuit. Having a separate hardware fusion integrator 121 allows the fusion to occur faster and more accurately than purely in software. For hardware implementation of fusion methods, see "Hardware Sensor Fusion Solutions," by Kris Winer, last edited on Jul. 28, 2015, available 2016-Nov.-22 at qithub<dot>com/kriswiner/MPU-6050/wiki/Hardware-Sensor-Fusion-Solutions, where "<dot>" represents the period (".") in the actual URL.

The embodiment we built as a prototype as shown in FIG. 1C includes a hardware fusion integrator 121, which uses a co-processor that implements sensor fusion using Kalman filters. That embodiment of the fusion integrator 121 uses the EM7180SPF Ultra Low Power Sensor Fusion Platform made by EM Microelectronic SA of Marin, Switzerland. A data sheet is available (2016-Nov.-28) at www<dot>emmicroelectronic<dot>com/sites/default/files/public/products/datasheets/7180sfp-ds<dot>pdf, where "<dot>" represents the period (".") in the actual URL.

Most accelerometers have a useful range of motions they can sense with high precision. The accelerometer 127 we use to detect the fine kinematics of precision aiming in one embodiment of the invention (that shown in FIG. 1C) is an InvenSense MPU-9250 (InvenSense, Inc., San Jose, Calif., USA). The MPU-9250 is a 9-axis accelerometer, gyroscope, and magnetometer with an effective range of ±10 g. While this accelerometer works well for high-precision readings of the small motions and rotations expected in the kinematics of aiming a firearm, the recoil force of most firearms far exceeds the ±10 g range. For this reason, embodiments of the invention also include a separate high-G accelerometer 137 that has a range±100 g, and is used herein for detecting the recoil force of a firearm in order to detect the synchronization event. Because a high-G accelerometer such as unit 137 typically does not have sufficient accuracy for measuring the small motions involved in firing a firearm, so both the accelerometer 127 and the high-G accelerometer are used in embodiments of the invention. The high-g accelerometer 137 we used is a H3LIS331DL high-G MEMS accelerometer made by ST Microelectronics. See www<dot>st<dot>com/web/en/resource/technical/document/datasheet/DM00053090<dot>pdf, retrieved 2015-Dec.-31, where "<dot>" represents the period (".") in the actual URL.

The barometric pressure sensor 135 in one embodiment includes a temperature sensor 137, and is a Bosch BMP180 barometric pressure and temperature sensor. For more information, see ae-bst<dot>resource<dot>bosch<dot>com/media/products/dokumente/bmp180/BST-BMP180-DS000-12~1<dot>pdf, retrieved 2015-Dec.-31, where "<dot>" represents the period (".") in the actual URL.

The embodiment of FIG. 1A includes one or more electrodermal activity (EDA) sensors to generate data for an electroencephalogram (EEG) measurement (element 129), an electrocardiogram (ECG or EKG) measurement (element 131), and in some versions, and electromyography (EMG) measurement (element 131). These measurements are used in some embodiments to determine and provide feedback to the user on the mental state of the user. For example, in one version, feedback is provided to the user prior to the user attempting to fire in order to provide the user information that would be helpful to calm the user prior to attempting to shoot at a target.

EDA is the property of the human body that causes continuous variation in the electrical characteristics of the skin. Historically, EDA has also been known as skin conductance, galvanic skin response (GSR), electrodermal response (EDR), psychogalvanic reflex (PGR), skin conductance response (SCR), and skin conductance level (SCL). The long history of research into the active and passive electrical properties of the skin by a variety of disciplines has resulted in an excess of names, now standardized to electrodermal activity (EDA). The traditional theory of EDA holds that skin resistance varies with the state of sweat glands in the skin. Sweating is controlled by the sympathetic nervous system," (see en<dot>wikipedia<dot>org/wiki/Electrodermal activity, retrieved 2016-Dec.-10, where <dot> denoted the period "." In the actual URL) and skin conductance is an indication of psychological or physiological arousal. If the sympathetic branch of the autonomic nervous system is highly aroused, then sweat gland activity also increases, which in turn increases skin conductance. In this way, skin conductance can be a measure of emotional and sympathetic responses. More recent research and additional phenomena (resistance, potential, impedance, and admittance, sometimes responsive and sometimes apparently spontaneous) suggest this is not a complete answer, and research continues into the source and significance of EDA.

In one embodiment, EDA adhesive patches may be attached to the user and coupled to the microcontroller 103. In one embodiment, these include miniature radios and are read into the microcomputer 103 via an included wireless interface 105.

The microcontroller 103 used in one embodiment of the invention, e.g., the embodiment shown in FIG. 1C, is a Nordic Semiconductors nRF51822 microcontroller that includes such a wireless interface 105 (Wi-Fi, built in Bluetooth radio) and built in memory 107 ((256 k Flash memory and 16 k RAM). See www<dot>nordicsemi<dot>com/eng/Products/Bluetooth-Smart-Bluetooth-low-enero/nRF51822, retrieved 2015-Dec.-31 for details of versions 3.1 of the microcontroller, where "<dot>" represents the period (".") in the actual URL. This microcontroller has an ARM Cortex M0 core built-in.

The embodiment shown in FIG. 1C includes in display unit 109 a Texas Instruments LP55231 LED driver, whose specification may be retrieved (2015-Dec.-31) at www<dot>ti<dot>com/lit/ds/symlink/lp55231<dot>pdf, where "<dot>" represents the period (".") in the actual URL. The LED driver drives a set of LEDs included in display unit 109. The LEDs are arranged as a circle on a plane. The display unit is operative to display an arc of information, the location of the arc indicating the direction of correction the user needs to make to correct mistakes in aiming, and with the length of the arc indicating the mount of deviation of the user's measured kinematic parameters from a set of "ideal" parameters.

The display is designed to display the information to the user immediately upon a synchronization event occurring, e.g., within a very short period of time, e g., within 10 ms of shooting the firearm (in other versions, no later than 50 ms, or even 100 ms of the synchronization event). The displaying of the information to the user is in a manner that does not require the user to make conscious decisions or movements. In one example, the display is in the normal field of view of the user, so that the user will automatically see the display. The display contents may register in the user's brain before the user is even able to consciously see and interpret the display. Thus, in one version, the display is to present the information directly to the user's field of view. This is achieved by the display being in the housing that can be mounted onto the firearm to present the visual information directly to the user's field of view while shooting.

The apparatus embodiment of FIG. 1C operates with two crystal clocks, including an Abracon model ABS05 32.768 kHz Crystal, whose specifications are available (2015-Dec.-31) from www<dot>abracon<dot>com/Resonators/ABS05<dot>pdf, where "<dot>" represents the period (".") in the actual URL, and a Seiko Epson FA-20H 16 MHz crystal. See www5<dot>epsondevice<dot>com/en/products/mhz_range/fa20h<dot>html, and the specification file downloadable therefrom on 2015-Dec.-31, where "<dot>" represents the period (".") in the actual URL.

Wireless interface 105 included in the microcontroller used in FIG. 1C is coupled to a radio antenna. In one embodiment, the antenna is a W3008c ceramic antenna made by Pulse Engineering. See productfinder<dot>pulseeng<dot>com/products/datasheets/W3008_W3008C<dot>pdf, retrieved Dec.-31-2015, where "<dot>" represents the period (".") in the actual URL.

A battery 117 is included to power the system. A charge controller 115 for the battery 117 includes a Maxim Dual-Input Li+ Charger model MAX1555. See datasheets<dot>maximintegrated<dot>com/en/ds/MAX1551-MAX1555<dot>pdf, retrieved 2015-Dec.-31, where "<dot>" represents the period (".") in the actual URL. One embodiment also includes a Texas Instruments low-drop 200 mA 2.8 v Regulator power regulator model TLV70728. See www<dot>ti<dot>com/lit/ds/symlink/tlv707<dot>pdf, retrieved 2015-Dec.-31, where "<dot>" represents the period (".") in the actual URL. The charging of the battery 117 is via a USB connection, shown as serial interface 119. One embodiment of interface 119 uses a Hirose model ZX62-B-SPA MicroUSB connector. See the document "ed_ZX_20140804.pdf" retrieved 2015-Dec.-31 at https://www<dot>hirose<dot>co<dot>jp/cataloge_hp/ed_ZX_20140804<dot>pdf, where "<dot>" represents the period (".") in the actual URL.

The current design per FIG. 1C has the serial data lines connected to the programming pins of the microcontroller 103. The serial interface 119 can be used, for example, for firmware updates. In an alternate embodiment, a Future Technology Devices international (FTDI) USB Controller chip is included that allows the device of any of FIGS. 1A-1C to be attached to a USB Host (PC) as a peripheral. This provides for reading live data from the device and also provides a mechanism for firmware updates.

The USB connection element (which can also be able to provide the power to the charging circuit) where serial data can be transferred between the apparatus and a secondary apparatus such as a smart phone or tablet device for purposes of data transmission and software update.

Note that alternate embodiments of the microcontroller system may include more than one radio interface 105, e.g., that includes one or more of a Bluetooth, Wi-Fi, Zigbee, and Z-Wave.

Figure 2A:
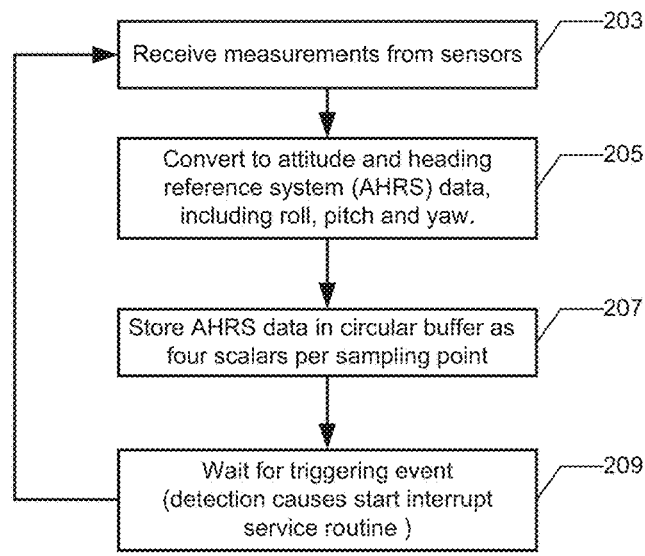
FIG. 2A shows a simplified flowchart of one method embodiment of the invention.
Figure 2B:
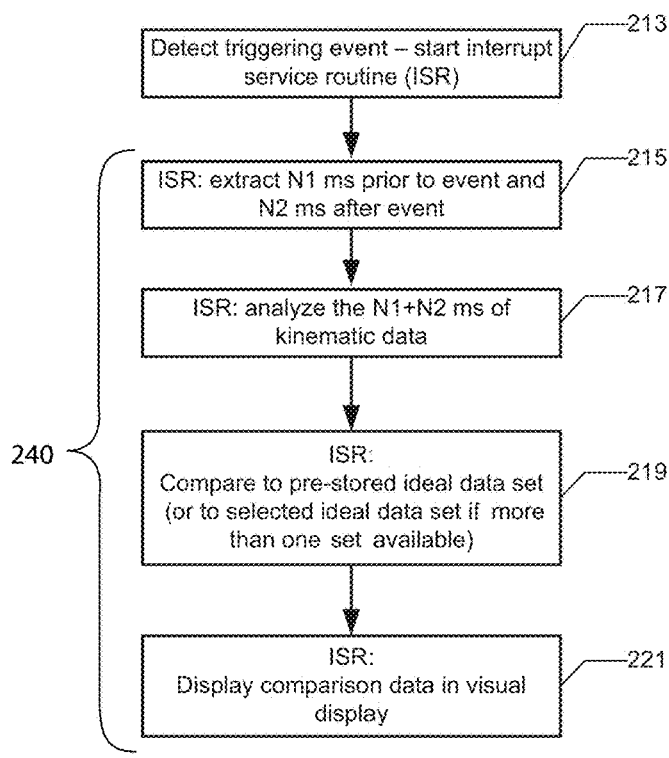
FIG. 2B shows a simplified flowchart of an interrupt service routine that occurs when a target force is detected in accordance with one method embodiment of the invention, and that in one version includes checking changes in the atmospheric pressure.

FIG. 2A shows a simplified flowchart of one method embodiment of the invention. In step 203, measurements are obtained from the sensors. In 205, the collected measurements are converted to desired types of parameters, in one embodiment by carrying out a fusion method to determine motion data, e.g., attitude and heading reference system (AHRS) data, including roll, pitch and yaw. In 207, the motion data is stored in a data structure, which in one embodiment in a circular buffer that is sufficient to store enough data to carry out detection of a synchronization event and maintain data that occurred after the synchronization event. In one embodiment, the buffer stored at least 300 ms of data. In such an embodiment, the data for any instant of time in the circular buffer includes four parameters, as is common in fusion methods. In 209, the data is analyzed to detect a potential synchronization event, e.g., a potential shooting of the firearm in the case of a firearm. When a gun is fired, there typically is a pressure wave, which may be detected, e.g., by the barometric pressure sensor 135, Furthermore, there is a force, e.g., a recoil force which may be detected by the high-g accelerometer 137. One embodiment combines pressure and high-g motion to detect the synchronization event (the firing of the firearm). In one version, the combining starts with detecting the large-g force in step 209, which when such a force is detected, causes an interrupt that in turn causes an interrupt service routine (ISR) to execute on the microcontroller. FIG. 2B show a simplified flowchart of the ISR 240 including step 213 of detecting the trigger that causes the ISR to be carried out, and steps 215 to 221 shown as ISR 240.

If there is both a noise trigger event and an atmospheric pressure trigger event, the method assumes that the synchronization event, e.g., the shooting of the gun actually occurred, and the interrupt cause the process to carry out ISR 240 of steps 215-221. The determining whether there occurred the synchronization event happens relatively fast—in the order of a few microseconds rather than a few milliseconds.

As described above, each sensor may have a different sampling rate. The accelerometer used in one implementation has the highest sampling rate of 1 kHz. In that implementation, the magnetometer has the lowest sampling rate, 50 Hz. The data however is provided at the highest sampling rate to the fusion method, with interpolation (such term including extrapolation and prediction) used to fill in values when the sampling rate is less than the highest.

In one implementation, the ISR 240 moves the data from the circular buffer via a BLE UART. This data is used by the MCU 103 to calculate a velocity magnitude and direction. Referring to ISR 240 FIG. 2B, once a trigger event is detected in 213, step 215 includes extracting N1 ms of captured motion data from before the trigger event, e.g., 100 ms of motion data (in other embodiments, 200 ms of motion data) from before the event, and N2 ms of captured motion data after the event, e.g., 50 ms of motion data (in one alternate embodiment, 5 ms of motion data, in another 20 ms of motion data, and in yet another 50 ms of motion data) after the event. Step 217 includes analyzing the extracted data, and step 219 includes comparing the extracted and analyzed motion data with the same amount of ideal motion data. In one embodiment, the ideal motion data is pre-stored data obtained from one or more expert marksmen shooting at the target. In one version, there is a single set of expert data, while in other versions, for the display based on the motion detected by the sensors especially the gyroscope 125 and accelerometer 127 (and adding the magnetometer in some versions). The kinematics are determined, e.g., using the fusion integrator 121 either prior to storing into the buffer (FIG. 2A), or in analysis step 217.

Figure 3:
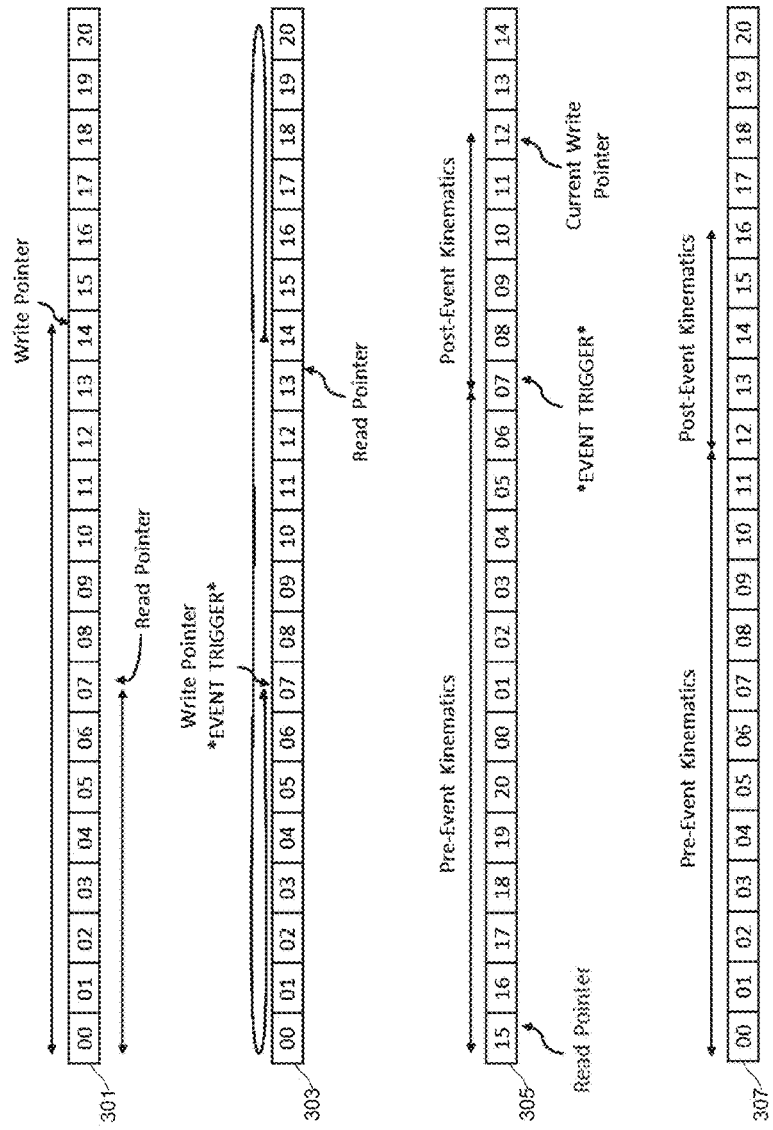
FIG. 3 shows an example of a circular buffer data structure that can hold sufficient data to capture data from included sensors before a synchronization event (the shooting of a firearm) and after the synchronization event, in accordance with one embodiment of the invention.

FIG. 3 shows illustrative examples of an example circular buffer data structure capable of holding sufficient data captured from the sensors before a synchronization event (the shooting of a firearm) and after the event. The drawing shows the buffer during the collection of event of sequence data just prior to and just after the event, e.g., the firing of the firearm. In this example, the buffer can hold 21 four-element samples, this number being for illustrative purpose only. Four states 301, 303, 305, and 307 are shown of the circular buffer data structure. Per the flowchart of FIG. 2A, data continues to fill the buffer (and refill the buffer after it is full—hence "circular" buffer) until an event is detected. In one embodiment, a two-stage process is used, in which in a first stage potential trigger event is determined, after which, point analysis is carried out to determine the exact point in time of the event. At this point in the process, data capture is stopped, and the captured data analyzed.

In state 301, the read pointer is shown at sample 07 and the write pointer at sample 14. Data analysis continues as data is written in to the buffer. In state 303, the write buffer has continued to write (continuing with sample 00 after sample 20) and an event trigger is shown at sample 07 while the write pointer is at that sample 07. State 305 is shown some time later after the trigger point (07) is determined, and shows, once this point is determined (at step 213), the data before the event (pre-event kinematics) and after the event (post-event kinematics) that is used to clarify the event. This is an example of how the information is captured by the apparatus and stored to be compared with the ideal data of the desired motion(s). State 307 shows a different situation where the event is detected at sample 12.

Figure 4A:
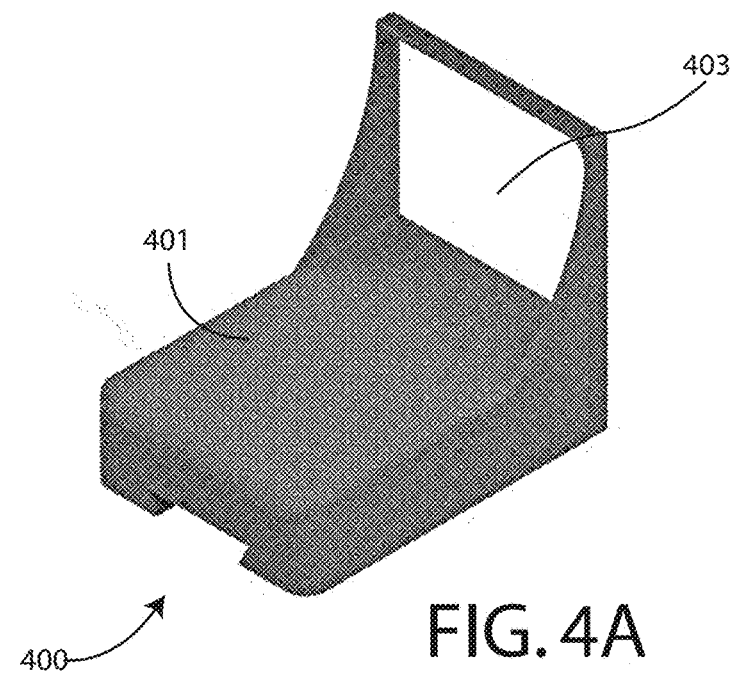
FIG. 4A shows an example of a device cover made of plastic material for an apparatus embodiment of the invention using a planar OLED display. Other planar display embodiments use a different planar display.
Figure 4B:
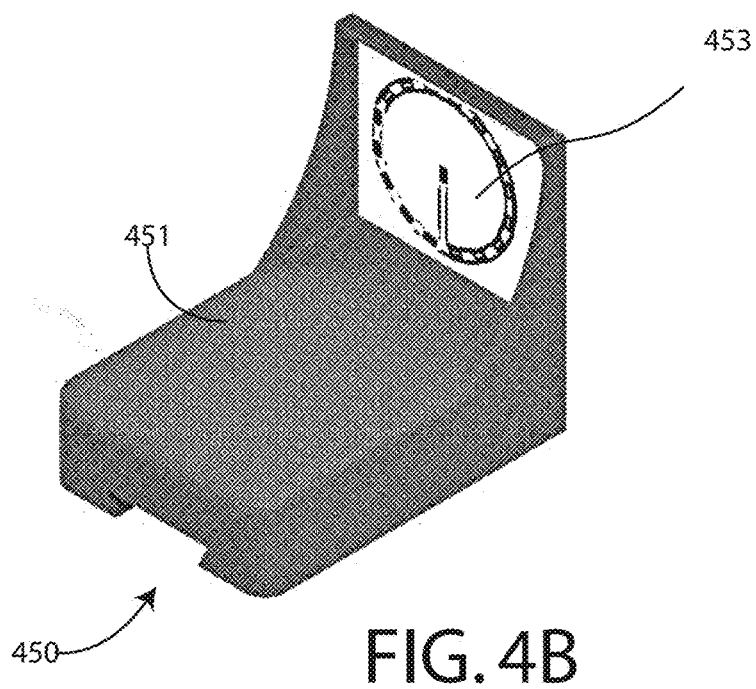
FIG. 4B shows another example of a device cover made of plastic for an apparatus embodiment of the invention using a circular ring of LEDs.
Figure 4C:
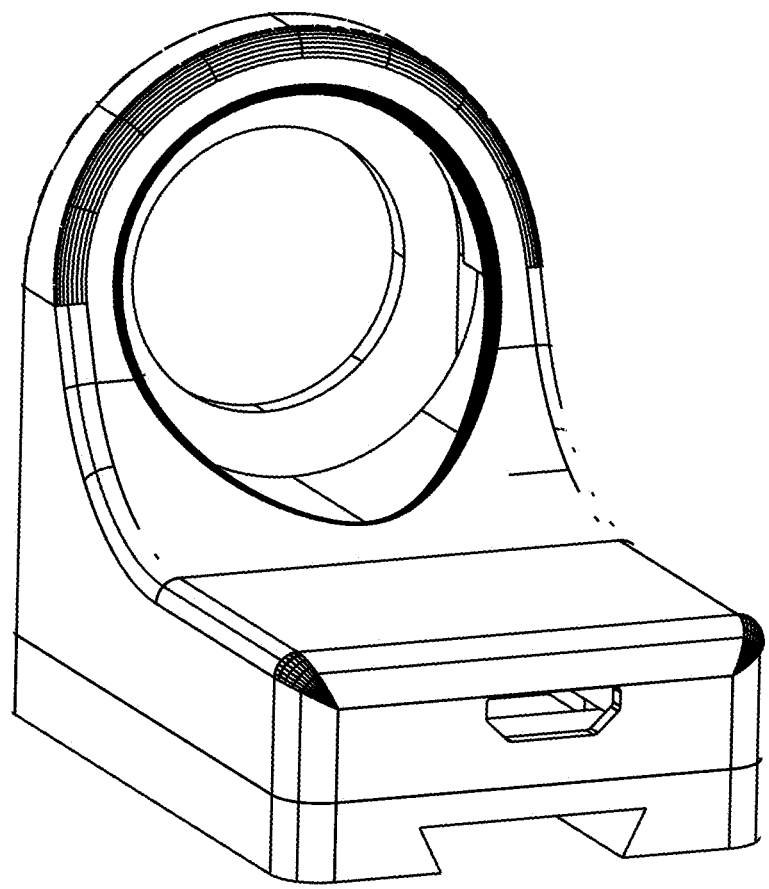
FIG. 4C shows a CAD wireframe line drawing of an embodiment of the device cover of FIG. 4B.

FIGS. 4A-4C show examples of the housing of the device, which in one embodiment is made of plastic. A circuit board with the electronic elements is housed on the housing, as is the display.

FIG. 4A shows an embodiment of the apparatus using a planar display, e.g., a planar OLED display, which is again shown in FIG. 6. FIG. 4B shows an embodiment of the invention using a circular ring of LEDs. FIG. 4C shows a CAD wireframe line drawing of an embodiment of the device cover of FIG. 4B.

Figure 5A:
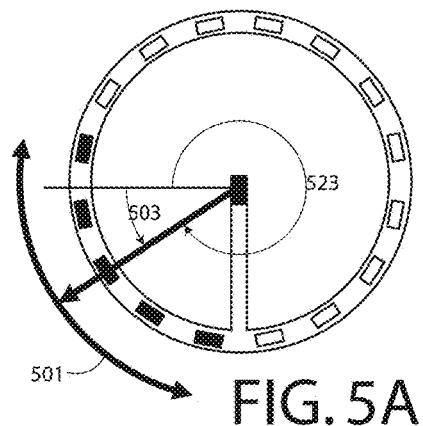
Figure 5B:
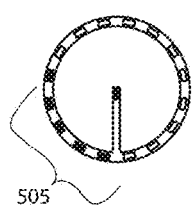
FIGS. 5B-5G are simplified plane view images of the LED ring display after six different shoots, and show six different displays with different amounts of error indicated by different arc lengths, in accordance with an embodiment of the present invention.
Figure 5C:
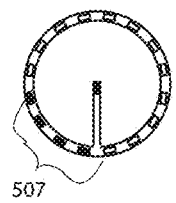
Figure 5D:
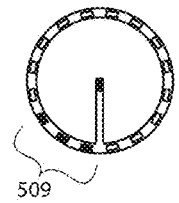
Figure 5E:
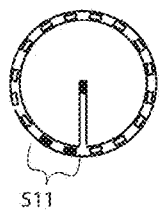
Figure 5F:
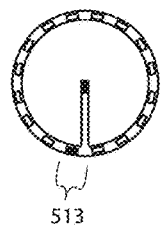

The LED embodiment is further shown in FIGS. 5A and 5B. FIG. 5A shows an example of the LED ring display, while FIG. 5B-5G show the LED ring after six different shoots, and shows six different displays with different amounts of error shown as arc lengths 505, 507, 509, 511, 513, and 515, respectively. In FIG. 5A, a band of LEDs in the general direction indicated by the vector at (negative) angle 503 (or positive angle 523 denote the direction of the error of a shot, with the width of the band of LEDs indicated by arc length shown by arc 510, indicate the magnitude of the error. According to one embodiment, the LED display assembly is (temporarily) attached to firearm in order to be directly in the field of view of the person being trained. The feedback is provided to the shooter within a short period of time, e.g., 5 to 10 ms after the shot is detected (at most 100 ms). This is so soon after the shot that the user would not yet be able to consciously think about and consider the result. The provision of such feedback so quickly is believed to be one of the reasons the invention is effective in training marksmanship.

Figure 5G:
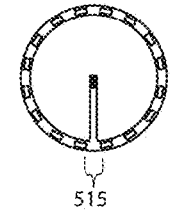

FIGS. 5B-5G shows instances of the display after six different shots are taken, each producing a respective error (compared to the pre-stored expert or ideal motions). FIG. 5B shows the largest error, as indicated by the width 505 of the band of LEDs shown lit, then FIGS. 5C, 5D, 5E, and 5F show smaller and smaller deviations 507, 509, 511, and 513, respectively, all in the same direction. FIG. 5G shows the display for the case that the shooter marched the movements of the "expert" represented by the rep-stored "ideal" data (minimal error 515).

Note that while each of FIGS. 5A-5G shows a ring display that uses discrete LEDs, in an alternate embodiment, made with mass production, the density of LEDs is much larger, with the sizes of the LEDs correspondingly smaller. Note also that in addition to the width of the band of active LEDs, in a more sophisticated embodiment, the magnitude of the deviation obtained or the particular shot is made even more perceivable by modulating the intensity of the light output from the LEDs. Other variations also are possible. In all these embodiments, there is indication of at least one of direction and magnitude of the difference between the motions of a user and ideal motions, and in the case both direction and magnitude are displayed, these quantities are patently clear with even a casual glance. The feedback is provided very soon after a shot is taken, such that the user can be presented with feedback almost instantly (within, e.g., 10 ms, but not later than 100 ms of the synchronization event), and presumably before the user has time to think about the result.

Figure 6A:
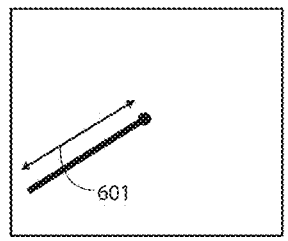
Figure 6B:
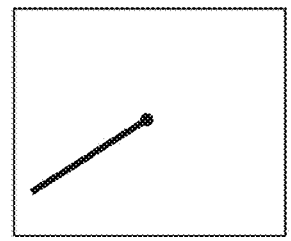
FIGS. 6B-6F show the flat panel display element after five different shoots, and show five different displays with different amounts of error.
Figure 6C:
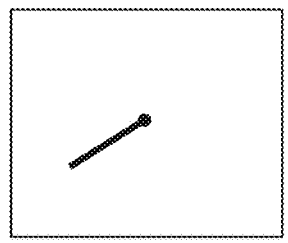
Figure 6D:
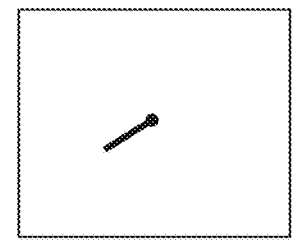
Figure 6E:
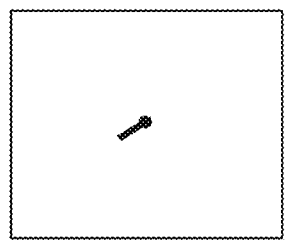
Figure 6F:
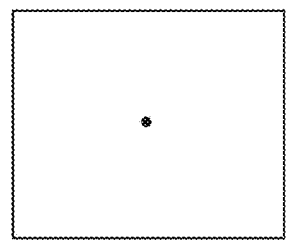

FIGS. 6A-6F show different examples displays of an alternate embodiment of the apparatus that includes a display subassembly 109 that includes a flat panel display, which in one version is an OLED display element and in another version, an LCD display element. As a result of a synchronization event (a shot fired), the error of each shot is displayed as a line in the direction of the deviation of motions from the ideal, with the length of the line, e.g., length 601 in FIG. 6A used as an indication of magnitude of the deviation. FIG. 6A shows a shot with the largest error, then FIGS. 6B, 6C, 6D, and 6E show smaller and smaller deviations all in the same direction. FIG. 6F shows the display for the case that the shooter marched the movements of the "expert" represented by the rep-stored "ideal" data.

The housing of the device shown in FIGS. 4A-4C includes a mounting mechanism that enables mounting to the firearm (or to the cue stick for cue games or bow for archery, etc.) in a manner that provides the visual feedback to the user immediately upon shooting (within 10 ms or so, but no more than 50 ms after the synchronization event). One version of the housing includes a set of mounting elements that attaches to a rail on the firearm. One version of the set of mounting elements attaches to a so-called Picatinny rail, also known as a MIL-STD-1913 rail, which is a bracket that provides a standard mounting platform comprising rails with multiple transverse slots used to mount sights and other elements to firearms. Other embodiments use alternate mounting systems, and many such systems are known in the art. One such alternative is the KeyMod system, which is not as bulky as using a Picatinny rail. Another alternative is the M-Lok system. Embodiments of the invention that include a mounting mechanism are not limited to having a Picatinny-compatible system.

Feedback for Different Skill Components of the Overall Marksmanship Task

It is known that different types of errors are associated with different skill components of an overall marksmanship task. For example, in the case of firing a firearm the user may flinch when firing, there may be pre-shop wandering of the gun, the user (when a trigger is involve in firing) may be squeezing the trigger too hard when firing, the user may be "milking" the trigger, which is the tendency to squeeze all fingers rather than only the finger on the trigger when shooting, and so forth. Some embodiments of the apparatus and the method of operating the apparatus each includes limiting the training to a selected particular skill component. In such embodiments, the presenting the feedback to the user is limited to feedback on the type of error or errors associated with the of the selected particular skill component. That is, some embodiments of the invention enable selecting a particular training program that trains for improving a particular component of the overall marksmanship skill. When such a skill component is selected, the feedback provided to the user is limited to the one or more types of errors that are associated with that particular skill component.

For example, consider a right handed user. Milking the trigger would cause shots to miss the target in a downward direction towards the side opposite to the hand used on the trigger, i.e., to the left side for the right-handed user. Suppose such a user selects training to reduce his or her tendency to milk the trigger. There may be other errors the user makes. However, when training for a particular skill component, one embodiment includes presenting feedback only on error or errors associated with, e.g., caused by that particular marksmanship skill component. Using milking the trigger as an example, one embodiment would limit the error to be that of moving down and to the left (for a right handed shooter). In the apparatus that uses a ring of LEDs, the feedback would be limited to lighting up a band of LEDs in the lower left quadrant, with the arc length of the band indicative of the magnitude of the error in that direction. A left-handed shooter's feedback, of course, would be limited to the lower right quadrant.

As another milking-the-trigger skill component example, for an apparatus embodiment that provides aural feedback, e.g., beeps of different loudness and/or time duration, the beeps only would occur for errors in the direction of the left hand lower quadrant (for a right-handed shooter) and the loudness and/or time duration would be based on the magnitude of the error. If binaural processing is includes in the providing of aural feedback, the direction would be limited to the lower left quadrant (for the right-handed shooter) or lower right quadrant (for a left-handed shooter).

As another example, it is known that flinching causes the gun to shoot low. Suppose \ a user selects training to reduce his or her tendency to flinch when shooting. One embodiment of the apparatus (and method of operating the apparatus) would limit the feedback presented to the user on errors to errors typical for flinching, e.g., errors in the downward direction.

Thus, while one embodiment is designed to provide feedback on any error made by the user, some embodiments of the invention include providing the user a mechanism to choose to work on a particular skill component of the overall marksmanship task, and limit feedback to the type of errors associated with the chosen skill component. Some embodiments furthermore, provide a sequence of training exercises, each designed to improve a particular skill component of the overall marksmanship skill, such that completing the sequence provides for the user an opportunity to improve each skill component in the sequence.

While the above describes skill component involved in firearm marksmanship, other types of marksmanship, e.g., archery also involves a set of skill components of the overall marksmanship task, with each skill component associated with one or more types of error. Some embodiments of the invention provide a user with the ability to select a particular skill component to work on, and limit the feedback to the type of error or errors associated with the particular skill component.

Presenting Feedback to a Secondary Device

Another aspect of the invention is a method of presenting feedback data to a user using a secondary device, e.g., a mobile device such as a cellular telephone which is wirelessly coupled, e.g., using Bluetooth (BLE) to the apparatus described herein, e.g., the apparatus of FIG. 1C that is attached to the firearm, and that includes a processor, a display screen, a user input mechanism, e.g., a tough sensitive surface on the display device, a wireless interface, and a memory subsystem that includes instructions that when executed, carry out the method of presenting feedback. In one example, the secondary device is a cellular telephone or a tablet device running iOS® which in another, a cellular telephone or a tablet device running Android®. In each case, a software application (an "app") in the memory subsystem when executed on the processor of the secondary device carries out the method.

In one version, once the secondary device is wirelessly coupled to the apparatus the secondary device receives a small. e.g., 40-byte amount of data at a regular interval. The app causes an animated display of the firearm to appear in the display screen as the firearm moves. When a triggering event is detected, e.g., when the firearm is discharged, the secondary device received a packet of data, which in one embodiment, is 5 kilobytes data so that the user's movements can be analyzed on the secondary device in greater detail than on the firearm-mounted device.

Figure 7:
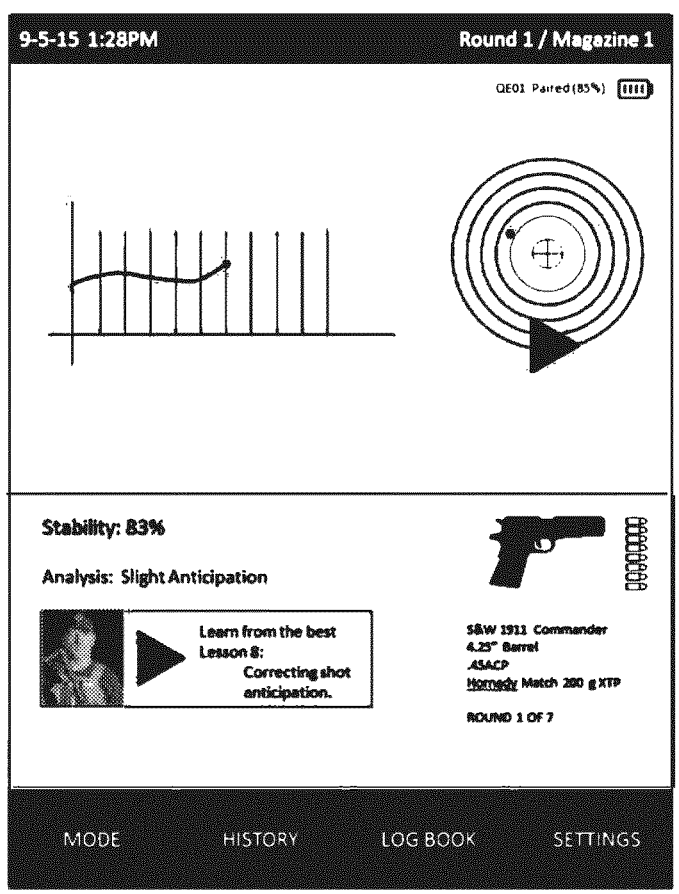
FIG. 7 shows an example of feedback that might be provided on a secondary apparatus, e.g., a cell phone according to an embodiment of the invention.

FIG. 7 shows one example of the feedback given on a secondary apparatus, e.g., a cell phone, such feedback describing the entire sequence. The example illustrated is for feedback from use for training how to shoot a firearm. See below for an alternate embodiment of a software application (an "app") operating on the mobile device. The example for FIG. 7 comprises a time lapsed graph in the upper left which displays a motion over the time of the event. The upper right display is a static image of a playable video that can play back the motion of the firearm over the entire time of the sequence. The bottom portion of the display is verbal feedback on the sequence, progress in the training of the actions being learned, and on the left is a representation of where in a sequence of steps (in this case shots in a magazine of shooting) are shown.

FIG. 8-14 show screen displays on the secondary device caused by the software (the app) operating on the secondary device.

At first, a main screen displayed on the secondary device when the app is loaded and executed. Different views we call fragments may be selected by the user: In one version, the fragments include ACTIVITY, FIREARM, AMMUNITION, LIVE FIRE, ANALYSIS, and SUMMARY fragments. If the user selects an item in a fragment that is available, e.g., has been unlocked, they automatically navigate to the next fragment. In one version, if the user selects (clicks on) a locked item, a "Fragment Dialog" pops-up which provides to the user a description of that item or activity and provides an option to make an in-app purchase of this content.

One view is that of ACTIVITY which enables a user to select an activity. Another view, FIREARM, allows the user to selects the firearm the user will be using from an inventory, e.g., a standard inventory or a custom inventory. Once the firearm is selected, the user can select the AMMUNITION view that provides for the user ability to select the ammunition the user will use.

Once the activity, the firearm, and the ammunition are selected, the user can go to the LIVE FIRE view in an animated display is presented that is similar to a chart recorder that renders real-time motions of the firearm. Each time the firearm is discharged, a high-resolution recording of the motions prior to the discharge are recorded. After firing the weapon a number of times, the user can view the results of analyses of the user's kinetic motions. Each activity has a scripted set of actions and when the user has finished performing that set of actions the user can see an analysis of the overall activity.

In more detail, the first step the user does is to select an activity.

Once the activity is selected, the software is operative to cause the secondary device to display the FIREARM fragment. This fragment, shown in FIG. 8, allows the user to select a firearm from an available inventory, or to add a firearm to the inventory. Shown is the case of the user selecting to add a new firearm. This causes a new window shown to FIG. 9 to be displayed where the user can add a new firearm, in this case, an American Firearm P98 mode. In one version, the software is operative to cause the secondary device to display a drop-down autocomplete widget shown in FIG. 10. Data is populated from a firebase database that is available online on the Internet via an wireless interface included in the secondary device. The user is then able to selects the manufacturer, model, and caliber from provided Controls. Firearm capacity is direct numeric input. The user is able to select metric or imperial units, and to change the contents of the caliber control. The user also is able to take a photo of their firearm.

Once the firearm is selected, the software is operative to cause the secondary device to display the next fragment, which is the AMMUNITION fragment, shown in FIG. 11. If the user presses "Add New" then the software is operative to cause the secondary device to display a new FragmentDialog (as a "pops up") (not shown) so that the user can enter the details of a new ammunition supply to the available inventory on ammunition.

FIG. 12 shows the live data of the "LIVE FIRE" fragment that the software is operative to cause the secondary device to display after ammunition is selected. As described above, the software is operative to receive data from the gun-mounted apparatus that causes real time data to be displayed. In one version, two real-time graphs are displayed: a first graph that scrolls 1203 right-to-left like a chart recorder, and a second graph that is similar to an attitude display from an airplane cockpit.

In one version, two different log charts styles and three different reticle styles are available. The two log charts are: 1) "Aggregate Motion" which is a chart of pitch+yaw+roll, which is shown as display 1203, and 2) each of the Euler angles as a separate line graph ("Pitch Yaw Roll"), which are not shown. In other embodiments, other log charts, such as energy and conformity are available. Of course, other embodiments provide more or fewer types of log charts, as would be clear to one skilled in the art.

Each time a shot is detected, it is added to a list of shots shown in FIG. 12 as shots 2 to 7 (show 1 is off the display screen). The software is operative to cause the secondary device to allow the user to selects any of the previous shots. In response to the user's selecting one of the previous shots, the software is operative to cause the secondary device to display details of that previous shot, with the live view being temporarily frozen.

The details of a selected set of shots or a selected shot are shown in the Analysis fragment. The software is operative to cause the secondary device to display a projection of where each shot should have landed based on analysis of the recorded motions. The screen display of the ANALYSIS fragment is shown in FIG. 13, which shows the aggregate analysis of several magazines of shots. The user is able to photograph their target and cause the display to show superimposed projected impacts with the actual impacts. FIG. 14 shows an analysis of a magazine of shots. Note the automatic analysis which suggests that the user when firing may have used too light a trigger.

The above, with FIGS. 8-14 shows one example of the sort of analysis that one embodiment of an analysis method operating on a secondary device that is coupled to the main apparatus that is mounted on the firearm.

It is expected that embodiments of the invention can be used to learn marksmanship regardless of the skill level of the user. Embodiments of the invention may also be useful for an already trained marksman to regain loss of marksmanship skills because of delay in practice, as the result of an injury.

While the description herein is for an apparatus for and method of training for firearm marksmanship, the invention may also have benefit in training to accurately shoot in other tasks, e.g., in billiard games such as pool, billiards, and snooker, in throwing darts, in archery marksmanship. By adapting the feedback mechanisms to be presented to the user in a manner that does not require conscious effort to perceive the feedback, the invention also may be adapted to ten-pin bowling, to lawn bowls, in shooting a basketball, to batting in baseball, to batting in cricket, to baseball pitching, in training for other tasks requiring fine motor skills, e.g., performing precision surgical tasks, e.g., endoscopic surgery, fingering in playing some musical instruments, piloting stationary-wing and rotary wing aircraft, and so forth.

Summary of Some Specific Sets of Embodiments

Method embodiment set 1 is a set of embodiments each a method of training a human user for in a marksmanship task using a training apparatus, the marksmanship task requiring precision motor skills, the training apparatus operative to sense and record motions at sampling times occurring at a sampling rate and further occurring within a time window around a detected synchronization event, the method comprising:
  sensing and recording motions sensed by the one or more sensors;
  detecting a synchronization event;
  analyzing the sensed and recorded motions that were sensed in the time window;
  comparing the analyzed sensed and recorded motions with a set of desired analyzed motions to generate difference data; and
  responsive to the comparing, presenting to the user in the user's field of perception feedback including at least one of visual feedback in the user's field of view, aural feedback, and haptic feedback, the feedback indicating one or both the direction and magnitude of deviation of the analyzed sensed and recorded motions from the set of desired analyzed motions, the presenting the feedback to the user commencing no later than 100 ms after the synchronization event.

Method embodiment set 2 is a set of embodiments each a method as recited in method embodiment set 1, wherein the time window starts no later than 200 ms prior to the detected synchronization event motion.

Method embodiment set 3 is a set of embodiments each a method as recited in method embodiment set 1, wherein the presenting feedback to the user commences no later than 50 ms after the synchronization event.

Method embodiment set 4 is a set of embodiments each a method as recited in method embodiment set 1, wherein the presenting feedback to the user commences no later than 30 ms after the synchronization event.

Method embodiment set 5 is a set of embodiments each a method as recited in method embodiment set 1, wherein the presenting visual feedback to the user commences no later than 10 ms after the synchronization event.

Method embodiment set 6 is a set of embodiments each a method as recited in method embodiment set 1, wherein the presenting visual feedback to the user commences no later than 5 ms after the synchronization event.

Method embodiment set 7 is a set of embodiments each a method as recited in any one of method embodiment sets 1 to 6, wherein the presenting includes presenting visual feedback.

Method embodiment set 8 is a set of embodiments each a method as recited in method embodiment set 7, wherein the presenting also includes presenting one or both aural feedback and haptic feedback.

Method embodiment set 9 is a set of embodiments each a method as recited in any one of method embodiment sets 1 to 6, wherein the presenting includes presenting one or both aural feedback and haptic feedback.

Method embodiment set 10 is a set of embodiments each a method as recited in any one of method embodiment sets 1 to 9, wherein different types of errors are associated with different skill components of the marksmanship task, wherein the method includes limiting the training to a selected particular skill component, and wherein the presenting the feedback to the user is limited to feedback on the type of error or errors associated with the of the selected particular skill component.

Method embodiment set 11 is a set of embodiments each a method as recited in any one of method embodiment sets 1 to 10,
  wherein the marksmanship task is shooting a firearm,
  wherein the motion being recorded comprises a set of motion data elements, each set of motion data elements sampled at the sampling times by one or more sensor devices;
  wherein the one or more sensor devices comprise an accelerometer.

Method embodiment set 12 is a set of embodiments each a method as recited in method embodiment set 11, wherein the accelerometer is a three-axis accelerometer.

Method embodiment set 13 is a set of embodiments each a method as recited in any one of method embodiment sets 11 to 12, wherein the one or more sensor devices comprise a gyroscope.

Method embodiment set 14 is a set of embodiments each a method as recited in method embodiment set 13, wherein the gyroscope is a three-axis gyroscope.

Method embodiment set 15. The method as recited in any one of method embodiment sets 11 to 14, wherein the one or more sensor devices comprise a magnetometer.

Method embodiment set 16 is a set of embodiments each a method as recited in method embodiment set 15, wherein the magnetometer is a three-axis magnetometer.

Method embodiment set 17 is a set of embodiments each a method as recited in any one of method embodiment sets 1 to 16, wherein the storing is in a data structure.

Method embodiment set 18 is a set of embodiments each a method as recited in method embodiment set 17, wherein the data structure comprises a circular buffer.

Method embodiment set 19 is a set of embodiments, each a method as recited in any one of method embodiment sets 11 to 18, wherein the sampling rate is between 30 Hz and 1000 Hz.

Method embodiment set 20 is a set of embodiments, each a method as recited in embodiment set 19, wherein the sampling rate is a highest sampling rate sufficient to match a fastest sensor that is no slower than any other of the sensors, and wherein filling of the circular buffer from each sensor slower than the fastest sensor includes interpolating between samples of each said slower sensor such that the samples used for calculations are at the highest sampling rate.

Apparatus embodiment set 1 is a set of embodiments each an apparatus for helping train a human user for a marksmanship task, the apparatus comprising:

a processing system (103, 107) comprising at least one processor (103) and a memory (107) coupled to the processor;

one or more motion-measuring sensors (123, 125, 127, 129, 131, 133, 137, 139) including an accelerometer, the one or more motion-measuring sensors coupled to the processing system;

one or more output devices each operative to present feedback to a user, the one or more output devices including at least one of a visual display device arranged to be in the user's field of view, a device for presenting aural feedback, and a device for providing haptic feedback to the user;

wherein the processing system is operative to accept and record motions sensed by the one or more motion-measuring sensors at respective sampling times at a respective sampling rate for each sensor, to detect a synchronization event, to analyze the recorded motions that were sensed in a time window around the synchronization event, to compare the analyzed recorded motions with a set of desired analyzed motions to generate difference data; and responsive to the comparing, present to the user in the user's field of perception feedback, the accepting of motions sensed by each respective motion-measuring sensors being at s respective sampling times occurring at a respective sampling rate, the feedback including at least one of visual feedback on the display device, aural feedback, and haptic feedback, the feedback indicating one or both the direction and magnitude of deviation of the analyzed recorded motions from the set of desired analyzed motions, and wherein the presenting the feedback to the user commences no later than 100 ms after the detected synchronization event.

Apparatus embodiment set 2 is a set of embodiments each an apparatus as recited in apparatus embodiment set 1, wherein the time window starts no later than 200 ms prior to the synchronization event.

Apparatus embodiment set 3 is a set of embodiments each an apparatus as recited in apparatus embodiment set 1, wherein the presenting the feedback to the user commences no later than 50 ms after the detected synchronization event.

Apparatus embodiment set 4 is a set of embodiments each an apparatus as recited in apparatus embodiment set 1, wherein the presenting the feedback to the user commences no later than 30 ms after the detected synchronization event.

Apparatus embodiment set 5 is a set of embodiments each an apparatus as recited in apparatus embodiment set 1, wherein the presenting the feedback to the user commences no later than 10 ms after the detected synchronization event.

Apparatus embodiment set 6 is a set of embodiments each an apparatus as recited in apparatus embodiment set 1, wherein the time window starts no later than 5 ms prior to the synchronization event.

Apparatus embodiment set 7 is a set of embodiments each an apparatus as recited in any one of apparatus embodiment sets 1-6, wherein the one or more output devices includes the visual display device arranged to be in the user's field of view, and wherein the feedback includes visual feedback on the display device.

Apparatus embodiment set 8 is a set of embodiments each an apparatus as recited in any one of apparatus embodiment sets 1-7, wherein the one or more output devices includes at least one of the device for presenting aural feedback and the device for providing haptic feedback, and wherein the feedback includes at least one of aural feedback and haptic feedback.

Apparatus embodiment set 9 is a set of embodiments each an apparatus as recited in any one of apparatus embodiment sets 1-8, wherein the marksmanship task is shooting a firearm, wherein the motion being recorded comprises a set of motion data elements, each set of motion data elements sampled at the sampling times by one or more sensor devices;

wherein the one or more sensor devices comprise an accelerometer.

Apparatus embodiment set 10 is a set of embodiments each an apparatus as recited in apparatus embodiment set 9, wherein the accelerometer is a three-axis accelerometer.

Apparatus embodiment set 11 is a set of embodiments each an apparatus as recited in any one of apparatus embodiment sets 9-10, wherein the one or more sensor devices comprise a gyroscope.

Apparatus embodiment set 12 is a set of embodiments each an apparatus as recited in apparatus embodiment set 11, wherein the gyroscope is a three-axis gyroscope.

Apparatus embodiment set 13 is a set of embodiments each an apparatus as recited in any one of apparatus embodiment sets 9-11, wherein the one or more sensor devices comprise a magnetometer.

Apparatus embodiment set 14 is a set of embodiments each an apparatus as recited in apparatus embodiment set 13, wherein the magnetometer is a three-axis magnetometer.

Apparatus embodiment set 15 is a set of embodiments each an apparatus as recited in any one of apparatus embodiment sets 1-14, wherein different types of errors are associated with different skill components of the overall marksmanship task, wherein the processing system is operative to limit the training to a selected particular skill component, and wherein the presenting the feedback to the user is limited to feedback on the type of error or errors associated with the of the selected particular skill component.

Apparatus embodiment set 16 is a set of embodiments each an apparatus as recited in any one of apparatus embodiment sets 1-15, wherein the set of desired analyzed motions is obtained from one or more skilled marksmen.

Apparatus embodiment set 17 is a set of embodiments each an apparatus as recited in apparatus embodiment set 16, wherein the set of desired analyzed motions is selected from a plurality of different sets of desired analyzed motions.

Apparatus embodiment set 18 is a set of embodiments each an apparatus as recited in apparatus embodiment set 17, wherein the sets of desired analyzed motions are for one or more of different types of firearms, different types of training, and different stances used for firing.

Apparatus embodiment set 19 is a set of embodiments each an apparatus as recited in any one of apparatus embodiment sets 1-18, wherein the presenting of the feedback to the user is provided while the user has the same physical position, rotation, and angle of gaze as when the user fires the firearm.

Apparatus embodiment set 20 is a set of embodiments each an apparatus as recited in any one of apparatus embodiment sets 1-19, wherein the processing system is further operative to recording one or more items of information other than the motions.

Apparatus embodiment set 21 is a set of embodiments each an apparatus as recited in apparatus embodiment set 20, wherein the one or more other items of information include at least one of temperature, instantaneous barometric pressure, location, and time of day.

Apparatus embodiment set 22 is a set of embodiments each an apparatus as recited in any one of apparatus embodiment sets 1-21, wherein the analyzing the recorded motions determines rotations, translations, and accelerations of fine motor motions.

Apparatus embodiment set 23 is a set of embodiments each an apparatus as recited in any one of apparatus embodiment sets 1-22, wherein the one or more motion-measuring sensors and the one or more output devices are attachable to the user or to firearm equipment being used by the user.

Apparatus embodiment set 24 is a set of embodiments each an apparatus as recited in any one of apparatus embodiment sets 1-23, wherein the display device includes a ring structure, and the visual feedback includes illuminating a segment of the ring structure.

Apparatus embodiment set 25 is a set of embodiments each an apparatus as recited in apparatus claim 24, wherein the ring structure comprises light emitting diodes.

Apparatus embodiment set 26 is a set of embodiments each an apparatus as recited in any one of apparatus embodiment sets 1-25, wherein the display device includes a flat panel display element.

Apparatus embodiment set 27 is a set of embodiments each an apparatus as recited in any one of apparatus embodiment sets 1-26, further comprising one or more electrodermal activity sensors to generate at least one of an electroencephalogram measurement, an electrocardiogram, and an electromyography measurement, wherein the at least one measurement is used to determine and provide feedback to the user on the mental state of the user.

Apparatus embodiment set 28 is a set of embodiments each an apparatus as recited in any one of apparatus embodiment sets 1-27, further comprising a communication interface that provides for transmitting information to a secondary device.

Apparatus embodiment set 29 is a set of embodiments, each an apparatus as recited in any one of apparatus embodiments sets 1-28, wherein each respective sampling rate of a respective sensor is between 30 Hz and 1000 Hz.

Apparatus embodiment set 30 is a set of embodiments, each an apparatus as recited in any one of apparatus embodiments sets 1-29, wherein the data from each respective sensor is recorded into a circular buffer.

Apparatus embodiment set 31 is a set of embodiments, each an apparatus as recited in apparatus embodiment set 30, wherein the recording into the circular buffer is at a recording sampling rate equal to a highest sampling rate sufficient to match a fastest sensor that is no slower than any other of the sensors, and wherein recording into the circular buffer from each sensor slower than the fastest sensor includes interpolating between samples from said each slower sensor, such that the samples used for calculations from said each slower sensor are at the highest sampling rate.

Apparatus embodiment set 32 is a set of embodiments, each an apparatus as recited in any one of apparatus embodiment sets 1 to 31, wherein the processing system (103, 107) further comprising a co-processor for carrying out sensor fusion.

Computer-readable Embodiment set 1 is the set of embodiments, each a non-transitory computer-readable medium containing instructions that when executed by a processing system in a training apparatus, carry out a method of training a human for a marksmanship task using the training apparatus, the marksmanship task requiring precision motor skills, the training apparatus operative to sense and record motions at sampling times occurring at a sampling rate and further occurring within a time window around a detected synchronization event, the method being as recited in any one of method embodiment sets 1 to 20.

Computer-readable Embodiment set 2 is the set of embodiments, each a non-transitory computer-readable medium configured with a set of instructions that when executed by one or more processors of a processing system, causes carrying out a method including the method steps of any one of method embodiment sets 1 to 20.

General

Unless specifically stated otherwise, as apparent from the following discussions, it is appreciated that throughout the specification discussions utilizing terms such as "processing," "computing," "calculating," "determining" or the like, refer to the action and/or processes of a host device or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory.

The methodologies described herein are, in one embodiment, performable by one or more processors that accept machine-readable instructions, e.g., as firmware or as software, that when executed by one or more of the processors carry out at least one of the methods described herein. In such embodiments, any processor capable of executing a set of instructions (sequential or otherwise) that specify actions to be taken may be included. Thus, one example is a programmable microcontroller device. Another is a DSP device. Another is the CPU of a microprocessor or other computer-device, or the processing part of a larger ASIC. A processing system may include a memory subsystem including main RAM and/or a static RAM, and/or ROM. A bus subsystem may be included for communicating between the components. The processing system further may be a distributed processing system with processors coupled wirelessly or otherwise, e.g., by a network. If the processing system requires a display, such a display may be included. The processing system in some configurations may include a sound input device, a sound output device, and a network interface device. The memory subsystem thus includes a machine-readable non-transitory medium that is coded with, i.e., has stored therein a set of instructions to cause performing, when executed by one or more processors, one of more of the methods described herein. Note that when the method includes several elements, e.g., several steps, no ordering of such elements is implied, unless specifically stated. The instructions may reside in the hard disk, or may also reside, completely or at least partially, within the RAM and/or other elements within the processor during execution thereof by the system. Thus, the memory and the processor also constitute the non-transitory machine-readable medium with the instructions.

Furthermore, a non-transitory machine-readable medium may form a software product. For example, it may be that the instructions to carry out some of the methods, and thus form all or some elements of the inventive system or apparatus, may be stored as firmware. A software product may be available that contains the firmware, and that may be used to "flash" the firmware.

Note that while some diagram(s) only show(s) a single processor and a single memory that stores the machine-readable instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a non-transitory machine-readable medium coded with, i.e., having stored therein a set of instructions for execution on one or more processors, e.g., one or more processors that are part of the receiver forming a pen stroke capture system.

Note that, as is understood in the art, a machine with application-specific firmware for carrying out one or more aspects of the invention becomes a special purpose machine that is modified by the firmware to carry out one or more aspects of the invention. This is different than a general purpose processing system using software, as the machine is especially configured to carry out the one or more aspects. Furthermore, as would be known to one skilled in the art, if the number the units to be produced justifies the cost, any set of instructions in combination with elements such as the processor may be readily converted into a special purpose ASIC or custom integrated circuit. Methodologies and software have existed for years that accept the set of instructions and particulars of, for example, the processing engine 131, and automatically or mostly automatically great a design of special-purpose hardware, e.g., generate instructions to modify a gate array or similar programmable logic, or that generate an integrated circuit to carry out the functionality previously carried out by the set of instructions. Thus, as will be appreciated by those skilled in the art, embodiments of the present invention may be embodied as a method, an apparatus such as a special purpose apparatus, an apparatus such as a data DSP device plus firmware, or a non-transitory machine-readable medium. The machine-readable carrier medium carries host device readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form a computer program product on a non-transitory machine-readable storage medium encoded with machine-executable instructions.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a host device system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Note that the claims attached to this description form part of the description, so are incorporated by reference into the description, each claim forming a different set of one or more embodiments.

We claim:

1. A method of training a human user for a marksmanship task using a training apparatus, the marksmanship task being shooting a shooting device and requiring precision motor skills, the training apparatus including one or more sensors and operative to sense and record motions at a sampling rate and further occurring within a time window around a detected synchronization event, the method comprising:
    sensing and recording motions sensed by the one or more sensors while the one or more sensors are mechanically coupled to the shooting device, each sensor providing samples at respective sample times at a respective sampling rate for the sensor;
    detecting a synchronization event resulting from the user shooting with the shooting device while the user is in a shooting position and while the one or more sensors are mechanically coupled to the shooting device;
    analyzing the sensed and recorded motions that were sensed in the time window;
    comparing the analyzed sensed and recorded motions with a set of desired analyzed motions to generate difference data; and
    responsive to the comparing, presenting to the user in the user's field of perception feedback including at least one of visual feedback in the user's field of view when the user is in the shooting position, aural feedback, and haptic feedback, the feedback indicating one or both the direction and magnitude of deviation of the analyzed sensed and recorded motions from the set of desired analyzed motions, the presenting the feedback to the user commencing no later than 100 ms after the synchronization event.

2. The method as recited in claim 1, wherein the time window starts no later than 200 ms prior to the detected synchronization event.

3. The method as recited in claim 1, wherein the presenting feedback to the user commences no later than 50 ms after the synchronization event.

4. The method as recited in claim 1, wherein the presenting feedback to the user commences no later than 30 ms after the synchronization event.

5. The method as recited in claim 1, wherein the presenting visual feedback to the user commences no later than 10 ms after the synchronization event.

6. The method as recited in claim 1, wherein the presenting visual feedback to the user commences no later than 5 ms after the synchronization event.

7. The method as recited in claim 1, wherein the presenting includes presenting visual feedback in the user's field of view when the user is in the shooting position.

8. The method as recited in claim 7, wherein the presenting also includes presenting one or both aural feedback and haptic feedback.

9. The method as recited in claim 1, wherein the presenting includes presenting one or both aural feedback and haptic feedback.

10. The method as recited in claim 1, wherein different types of errors are associated with different skill components of the marksmanship task, wherein the method includes limiting the training to a selected particular skill component, and wherein the presenting the feedback to the user is limited to feedback on the type of error or errors associated with the of the selected particular skill component.

11. The method as recited in claim 1,
    wherein the shooting device is a firearm and the marksmanship task is shooting the firearm,
    wherein the motion being recorded comprises a set of motion data elements, each set of motion data elements sampled at the respective sampling times by at least one sensor of the one or more sensors;
    wherein the one or more sensors comprise an accelerometer.

12. The method as recited in claim 11, wherein the accelerometer is a three-axis accelerometer.

13. The method as recited in claim 11, wherein the one or more sensors comprise a gyroscope.

14. The method as recited in claim 13, wherein the gyroscope is a three-axis gyroscope.

15. The method as recited in claim 11, wherein the one or more sensors comprise a magnetometer.

16. The method as recited in claim 15, wherein the magnetometer is a three-axis magnetometer.

17. The method as recited in claim 1, wherein each respective sampling rate is between 30 Hz and 1000 Hz.

18. The method as recited in claim 1, wherein the storing is in a data structure.

19. The method as recited in claim 18, wherein the data structure comprises a circular buffer.

20. The method as recited in claim 19, wherein data from the one or more sensors is recorded at a respective recording sampling rate equal to the highest sampling rate sufficient to match a fastest sensor that is no slower than any other of the one or more sensors, and wherein filling of the circular buffer from each sensor that is slower than the fastest sensor includes interpolating between samples of each said slower sensor such that the samples used for calculations are at the highest sampling rate.

21. A non-transitory computer-readable medium containing instructions that when executed by a processing system in a training apparatus, carry out a method of helping train a human user for a marksmanship task using the training apparatus, the marksmanship task being shooting a shooting device and requiring precision motor skills, the training apparatus including one or more sensors and operative to sense and record motions at sampling times occurring at a sampling rate and further occurring within a time window, the method of training comprising:
    sensing and recording motions sensed by the one or more sensors that are mechanically coupled to the shooting device, each sensor providing samples at respective sample times at a respective sampling rate for the sensor;

detecting a synchronization event resulting from the user shooting with the shooting device while the user is in a shooting position and while the one or more sensors are mechanically coupled to the shooting device;

analyzing the sensed and recorded motions that were sensed in the time window;

comparing the analyzed sensed and recorded motions with a set of desired analyzed motions to generate difference data; and responsive to the comparing, presenting to the user in the user's field of perception feedback including at least one of visual feedback in the user's field of view when the user is in the shooting position, aural feedback, and haptic feedback, the feedback indicating one or both the direction and magnitude of deviation of the analyzed sensed and recorded motions from the set of desired analyzed motions, the presenting the feedback to the user commencing no later than 100 ms after the synchronization event.

22. The non-transitory computer-readable medium of claim 21, wherein the time window starts at most 200 ms prior to and ends at most 100 ms after a detected synchronization event, and wherein the presenting the feedback to the user commencing no later than 50 ms after the synchronization event.

23. The non-transitory computer-readable medium of claim 21, wherein the feedback includes visual feedback in the user's field of view.

24. An apparatus for helping train a human user for a marksmanship task of shooting a shooting device, the apparatus comprising:

a processing system comprising at least one processor and a memory coupled to the processor;

one or more motion-measuring sensors including an accelerometer, the one or more motion-measuring sensors coupled to the processing system and mechanically coupled to a mounting mechanism that is mountable on the shooting device;

one or more output devices each operative to present feedback to a user, the one or more output devices including at least one of a visual display device arranged to be in the user's field of view while the user is in a shooting position, a device for presenting aural feedback, and a device for providing haptic feedback to the user;

wherein the processing system is operative to accept and record motions sensed by the one or more motion-measuring sensors while the mounting mechanism is mounted on the shooting device, to detect a synchronization event resulting from the user shooting with the shooting device while the user is in the shooting position and while the mounting mechanism is mounted on the shooting device, to analyze the recorded motions that were sensed in a time window around the synchronization event, to compare the analyzed recorded motions with a set of desired analyzed motions to generate difference data; and responsive to the comparing, present to the user in the user's field of perception feedback, the accepting of motions sensed by each respective motion-measuring sensors being at s respective sampling times occurring at a respective sampling rate, the feedback including at least one of visual feedback on the display device in the user's field of view while the user is in a shooting position, aural feedback, and haptic feedback, the feedback indicating one or both the direction and magnitude of deviation of the analyzed recorded motions from the set of desired analyzed motions, and wherein the presenting the feedback to the user commences no later than 100 ms after the detected synchronization event.

25. The apparatus as recited in claim 24, wherein the time window starts no later than 200 ms prior to the synchronization event.

26. The apparatus as recited in claim 24, wherein the presenting the feedback to the user commences no later than 50 ms after the detected synchronization event.

27. The apparatus as recited in claim 24, wherein the presenting the feedback to the user commences no later than 30 ms after the detected synchronization event.

28. The apparatus as recited in claim 24, wherein the presenting the feedback to the user commences no later than 10 ms after the detected synchronization event.

29. The apparatus as recited in claim 24, wherein the time window starts no later than 5 ms prior to the synchronization event.

30. The apparatus as recited in claim 24, wherein the one or more output devices includes the visual display device arranged to be in the user's field of view, and wherein the feedback includes visual feedback on the display device.

31. The apparatus as recited in claim 24,
wherein the one or more output devices includes at least one of the device for presenting aural feedback and the device for providing haptic feedback, and
wherein the feedback includes at least one of aural feedback and haptic feedback.

32. The apparatus as recited in claim 24,
wherein the marksmanship task is shooting a firearm,
wherein the motion being recorded comprises a set of motion data elements, each set of motion data elements sampled at the sampling times by at least one of the one or more sensors;
wherein the one or more sensors comprise an accelerometer.

33. The apparatus as recited in claim 32, wherein the accelerometer is a three-axis accelerometer.

34. The apparatus as recited in claim 32, wherein the one or more sensors—comprise a gyroscope.

35. The apparatus as recited in claim 34, wherein the gyroscope is a three-axis gyroscope.

36. The apparatus as recited in claim 32, wherein the one or more sensors comprise a magnetometer.

37. The apparatus as recited in claim 36, wherein the magnetometer is a three-axis magnetometer.

38. The apparatus as recited in claim 24, wherein different types of errors are associated with different skill components of the overall marksmanship task, wherein the processing system is operative to limit the training to a selected particular skill component, and wherein the presenting the feedback to the user is limited to feedback on the type of error or errors associated with the of the selected particular skill component.

39. The apparatus as recited in claim 24, wherein the set of desired analyzed motions is obtained from one or more skilled marksmen.

40. The apparatus as recited in claim 39, wherein the set of desired analyzed motions is selected from a plurality of different sets of desired analyzed motions.

41. The apparatus as recited in claim 40, wherein the shooting device is a firearm, and wherein the sets of desired analyzed motions are for one or more of different types of firearms, different types of training, and different stances used for shooting the firearm.

42. The apparatus as recited in claim 24, wherein the presenting of the feedback to the user is provided while the user has the same physical position, rotation, and angle of gaze as when the user shoots the shooting device.

43. The apparatus as recited in claim 24, wherein the processing system is further operative to record one or more items of information other than the motions.

44. The apparatus as recited in claim 43, wherein the one or more other items of information include at least one of temperature, instantaneous barometric pressure, location, and time of day.

45. The apparatus as recited in claim 24, wherein the analyzing the recorded motions determines rotations, translations, and accelerations of fine motor motions.

46. The apparatus as recited in claim 24, wherein the display device includes a ring structure, and the visual feedback includes illuminating a segment of the ring structure.

47. The apparatus as recited in apparatus claim 46, wherein the ring structure comprises light emitting diodes.

48. The apparatus as recited in claim 24, wherein the display device includes a flat panel display element.

49. The apparatus as recited in claim 24, further comprising one or more electro-dermal activity sensors to generate at least one of an electroencephalogram measurement, an electrocardiogram, and an electromyography measurement, and wherein the at least one measurement is used to determine and provide feedback to the user on the mental state of the user.

50. The apparatus as recited in claim 24, further comprising a communication interface that provides for transmitting information to a secondary device.

51. The apparatus as recited claim 24, wherein each respective sampling rate is between 30 Hz and 1000 Hz.

52. The apparatus as recited claim 24, wherein the recording of the data from the sensors is into a circular buffer.

53. The apparatus as recited in claim 24, wherein the processing system further comprises a co-processor for carrying out sensor fusion.

54. The apparatus as recited in claim 52, wherein the data is recorded into the circular buffer at a recording sampling rate equal to the highest sampling rate sufficient to match a fastest sensor that is no slower than any other of the sensors, and wherein recording into the circular buffer from each sensor slower than the fastest sensor includes interpolating between samples from said each slower sensor, such that the samples used for calculations from said each slower sensor are at the highest sampling rate.

\* \* \* \* \*